(12) United States Patent
Yamanaka

(10) Patent No.: US 7,908,613 B2
(45) Date of Patent: Mar. 15, 2011

(54) DISK LOADING APPARATUS

(75) Inventor: Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 571 days.

(21) Appl. No.: 12/073,856

(22) Filed: Mar. 11, 2008

(65) Prior Publication Data

US 2008/0229344 A1 Sep. 18, 2008

(30) Foreign Application Priority Data

Mar. 12, 2007 (JP) ................................ 2007-062088

(51) Int. Cl.
*G11B 17/051* (2006.01)
*G11B 17/028* (2006.01)

(52) U.S. Cl. .................... 720/624; 720/626; 720/706

(58) Field of Classification Search .......... 720/604–605, 720/617–626, 631, 639–642, 645, 652; *G11B 17/04, G11B 17/05, 17/051*
See application file for complete search history.

(56) References Cited

U.S. PATENT DOCUMENTS

| | | | |
|---|---|---|---|
| 2005/0235300 A1* | 10/2005 | Kido | 720/621 |
| 2006/0242658 A1* | 10/2006 | Yoshimura et al. | 720/622 |
| 2007/0192776 A1* | 8/2007 | Ahn et al. | 720/623 |
| 2009/0049462 A1* | 2/2009 | Sato | 720/622 |

FOREIGN PATENT DOCUMENTS

| | | | |
|---|---|---|---|
| JP | 2000090531 A | * | 3/2000 |
| JP | 2002-298481 | | 10/2002 |

OTHER PUBLICATIONS

Machine-Assisted Translation of JP 2000090531 A.*

* cited by examiner

*Primary Examiner* — Thang V Tran
*Assistant Examiner* — Nathan A Danielsen
(74) *Attorney, Agent, or Firm* — Clark & Brody

(57) ABSTRACT

The present invention relates to a disc loading apparatus that has the capability of simplifying the assembly while improving thinning and reducing the number of components. With a disc loading apparatus according to the present invention, a portion of a top panel of the frame is designed to be a second mounting unit and another portion of the top panel to be a first mounting unit, the upper surface of the second mounting unit is sagged downward more than the lower surface of the first mounting unit, notches are provided appropriately at the steeped unit between the first and the second mounting units, the second mounting unit is a portion of the disc guide, the interlocking mechanism is mounted on the upper surface of the second mounting unit, and the pair of disc detection members is mounted on the lower surface of the first mounting unit, and these detection members are arranged throughout the lower surface of the first mounting unit and the upper surface of the second mounting unit through the notches.

2 Claims, 21 Drawing Sheets

DISK LOADING APPARATUS

BACKGROUND OF THE INVENTION

1. Field of the Invention

The present invention relates to a disc loading apparatus that devises simplifying assembly while improving thinning and reducing the number of components.

2. Description of the Prior Art

A disc loading apparatus that is able to load both large and small discs, generally provides a pair of right and left disc detection members having a detection unit, and also an interlocking mechanism is provided to make both disc detection members rotate synchronously, thereby detecting the disc position and disc diameter by the rotation amount while clamping of the disc by a roller and a disc guide, and the rotation of the roller are controlled.

Japanese Laid-open patent publication 2002-298481 discloses a disc loading apparatus. An insert port (12) for inserting a disc is formed on the front surface of a chassis (11), a top guide (41) is attached to the lower surface of the chassis, and a pair of right and left disc arms (62), (63) are arranged between the lower surface of the chassis and the upper surface of the top guide. A plurality of guide protrusions (45), (46), (47) are provided on the lower surface of the top guide, and the disc is clamped between a loading roller (42) and the guide protrusions, and the disc is fed by the rotation of the roller.

With the construction disclosed in Japanese Laid-open patent publication 2002-298481, because the guide protrusions must be provided at an overlapping position with the disc arms, the top guide is attached on the lower surface of the chassis, the disc arms are arranged between the top guide and the chassis, and the guide protrusions are provided on the lower surface of the top guide. However, improvement of thinning and reducing the number of components has been difficult because a process to attach the top guide to the chassis is required and a gap between the chassis and the top guide must be provided in order to arrange the disc arms.

The present invention is achieved in consideration of such problems described above, and the object is to provide a disc loading apparatus with the ability to simplify assembly while improving thinning and reducing the number of components.

SUMMARY OF THE INVENTION

The present invention proposes a disc loading apparatus which comprises a frame; a disc guide; a pair of disc detection members mounted in the frame providing detection units respectively; an interlocking mechanism mounted in the frame so as to synchronously rotate the detection members; and a roller mounted in the frame so as to clamp a disc in cooperation with the disc guide, and feed the disc by a rotational operation; wherein the pair of detection members rotate in the widening direction of the mutual gap of the detection members while each of the detection members is pushed to the circumference of the inserted disc; the disc position and disc diameter are detected by the rotation amount of the pair of disc detection members, and disc clamping by the roller and disc guide according to the disc position and the diameter, and the roller rotation are controlled,
wherein the disc loading apparatus further comprises a top panel provided in the frame; a second mounting unit formed on a portion of said top panel; a first mounting unit formed on another portion of the top panel; a stepped unit formed between the first and second mounting units by sagging the upper surface of the second mounting unit downward more than the lower surface of the first mounting unit; and a notch formed in said stepped unit, and wherein a portion of the disc guide is constituted in the second mounting unit, and the interlocking mechanisms are mounted on the upper surface of the second mounting unit; the pair of disc detection members are mounted on the lower surface of the first mounting unit, and are arranged throughout the lower surface of the first mounting unit and the upper surface of the second mounting unit.

Preferably, the rotation range of at least one of disc detection members is regulated by the end area of the notch.

The second mounting unit formed by sagging a portion of the top panel of the frame is used as a portion of the disc guide and also the mounting unit of the interlocking mechanism, and a pair of disc detection members mounted on the first mounting unit is arranged throughout the lower surface of the first mounting unit and the upper surface of the second mounting unit so that the detection members and the interlocking mechanism correlate on the upper surface of the second mounting unit, and the number of components can be reduced by having various roles for the second mounting unit. This allows simplifying the construction and makes improvement of thinning easier as a result. Because the upper surface side of the second mounting unit is open, the interlocking mechanism can attach easily to the upper surface of the second mounting unit, simplifying the assembly.

Furthermore, if the end of the notch is designed to be a stopper to regulate the rotation range of the disc detection member, there is no need to provide a stopper separately for the disc detection member, simplifying the construction even more.

BRIEF DESCRIPTION OF THE DRAWINGS

This invention will become more apparent upon a reading of the following detailed description with reference to the accompanying drawings, in which.

DETAILED DESCRIPTION OF THE PREFERRED EMBODIMENTS

Preferred Embodiments of the present invention will be described hereafter with reference to drawings.

Figure 1:
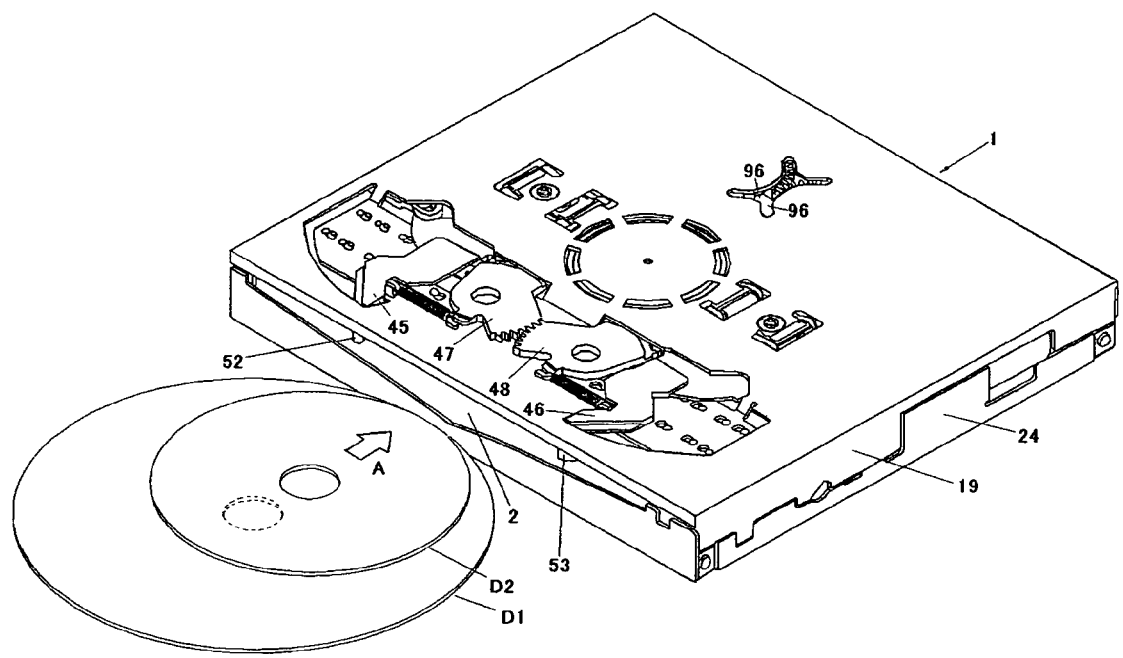
FIG. 1 is a diagrammatic perspective view showing a disc player that relates to the present invention.

FIG. 1 is a diagrammatic perspective view showing the exterior of a mechanism unit 1 of a disc player used for automobiles. At the front surface, the mechanism unit 1 of the disc player provides a disc insertion port 2 where a large disc D1 or small disc D2 is inserted and ejected. An arrow A shows the disc insert direction, and the opposite direction indicates the disc eject direction. Together, the disc insert direction and disc eject direction are collectively referred to as the disc insert/eject direction.

Figure 2:
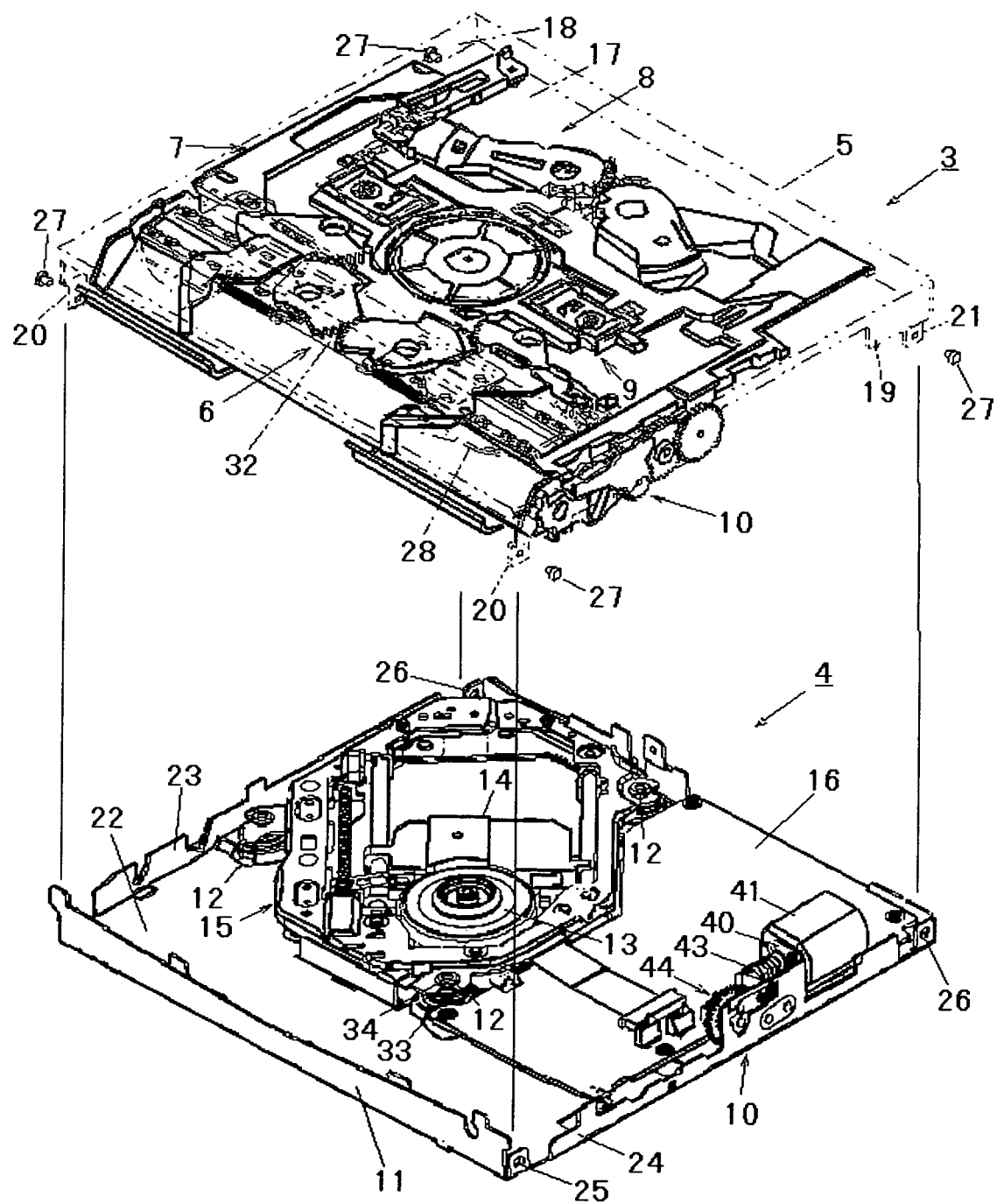
FIG. 2 is a diagrammatic perspective view showing the disc player shown in FIG. 1 breaking out the upper unit and lower unit.

FIG. 2 is a diagrammatic perspective view showing the mechanism unit 1 of the disc player by breaking out an upper unit 3 and a lower unit 4.

Figure 3:
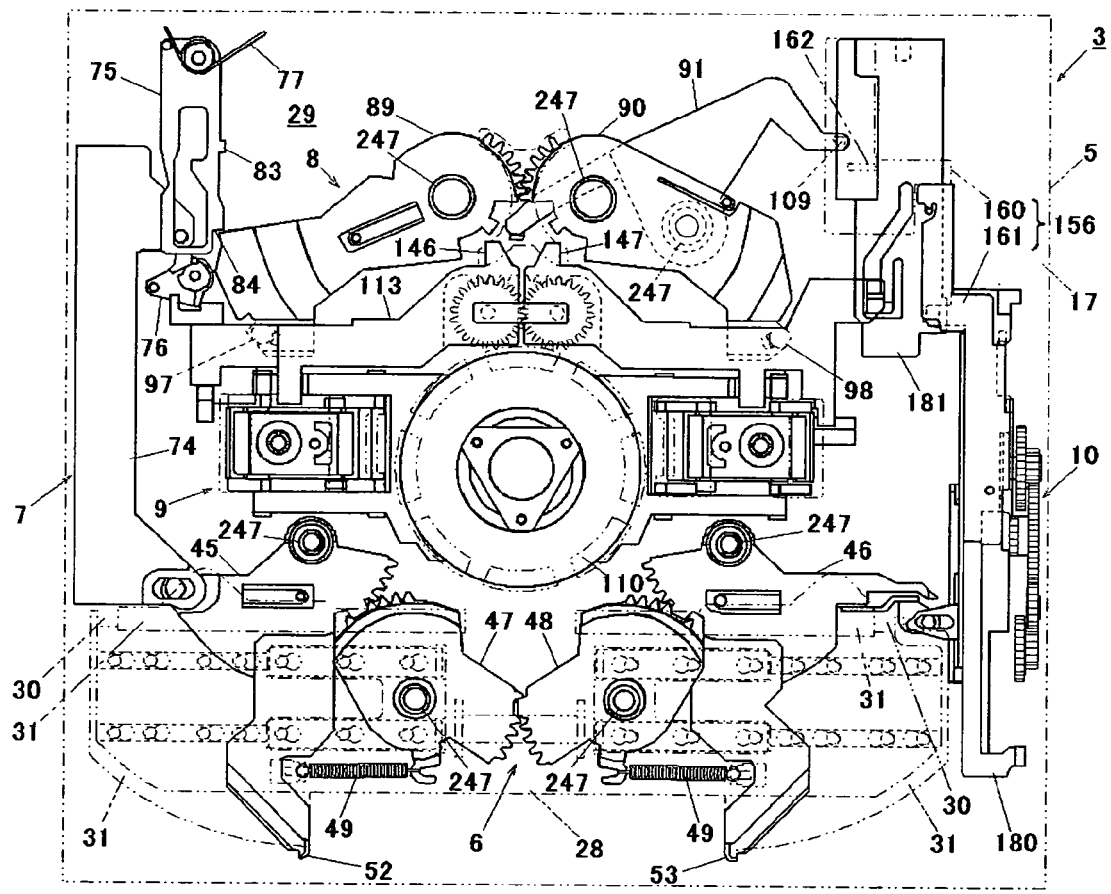
FIG. 3 is a top plan view showing the upper unit.
Figure 4:
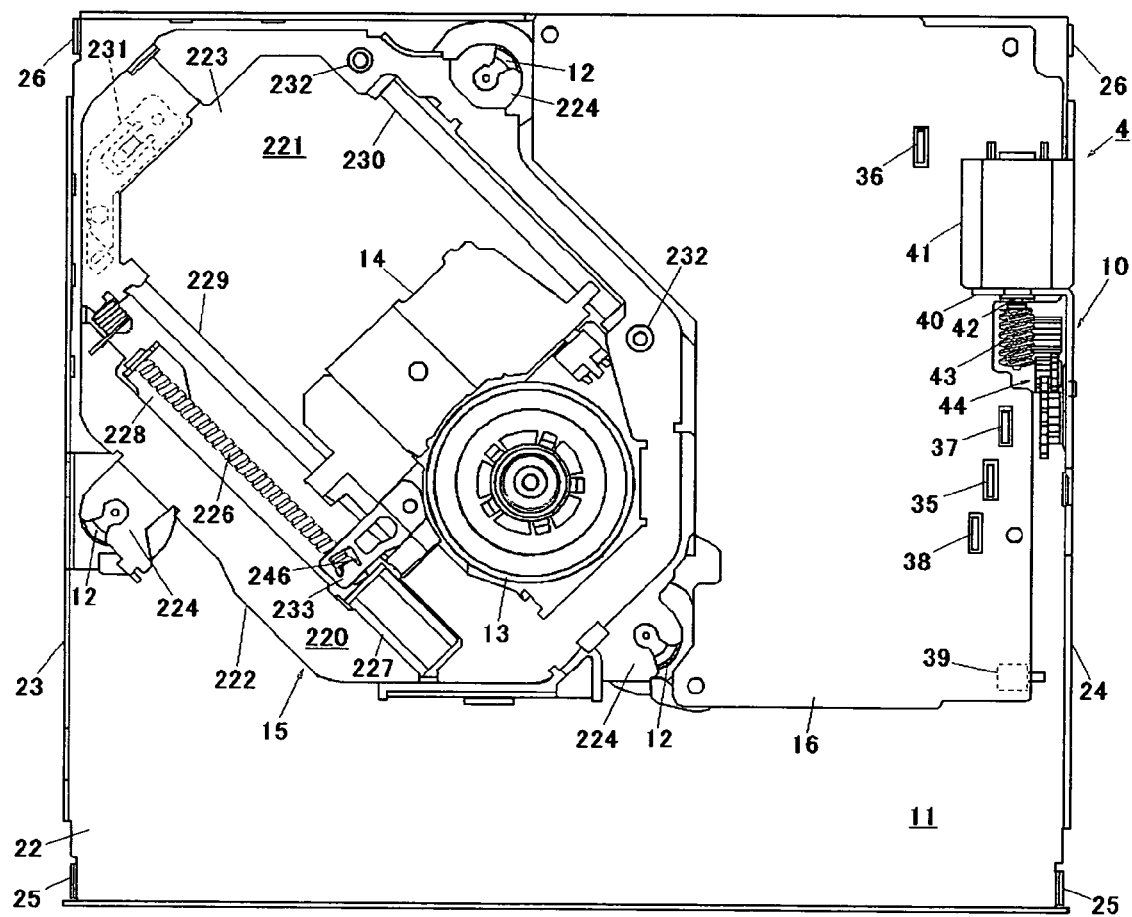
FIG. 4 is a top plan view showing the lower unit.

FIG. 3 shows a top plane view of the upper unit 3; and FIG. 4 shows a top plane view of the lower unit 4.

The upper unit 3, as shown in FIG. 2 and FIG. 3, comprises an upper frame 5 (shown by a virtual line), a disc detection mechanism 6, a disc size determination mechanism 7, a disc positioning mechanism 8, a clamping mechanism 9, and a portion of a loading mechanism 10.

The lower unit 4 comprises, as shown in FIG. 2 and FIG. 4, a lower frame 11, a damper 12 consisting of three buffer members, a pickup unit 15 including a turntable 13 with a built-in magnet and a pickup 14, a circuit substrate 16 providing a control circuit, and another portion of the loading mechanism 10.

The upper frame 5 consisting of a nearly rectangular metal plate, as shown in FIG. 2 and FIG. 3, has side panels formed by bending downward from four sides of a top panel 17, and superposition units 20, 21 are provided at the front and rear respectively in the disc insert/eject direction of the right and left side panels 18, 19. Further, the lower frame 11 consisting of a nearly rectangular metal plate, as shown in FIG. 2 and FIG. 4, has side panels which are formed by bending upward from the four sides of a bottom panel 22, and superposition units 25, 26 are provided at the front and rear respectively in the disc insert/eject direction of the right and left side panels 23, 24. Furthermore, combining the upper frame 5 and lower frame 11 is performed by superimposing the mutually corresponding superposition units and fixing by screw 27.

The top panel 17, as shown in FIG. 2 and FIG. 3, forms a long recess in the lateral direction through extrusion processing facing downward from the upper surface and such area becomes a second mounting unit 28, and the other area is a first mounting unit 29. Further, at a stepped unit 30 between the first and second mounting units 29, 28, a notch 31 is provided appropriately. Moreover, the second mounting unit 28 together with guide projections 203 which will be described hereafter constitutes a disc guide 32, making the rear side thereof the disc feeding path.

At the lower surface of the first mounting unit 29, a portion of the disc detection mechanism 6, a disc size determination mechanism 7, a disc position mechanism 8, a clamping mechanism 9, and a portion of the loading mechanism 10 are loaded.

At the upper surface of the bottom plate 22 of the lower frame 11, as shown in FIG. 2 and FIG. 4, each of the bodies 33 of the three dampers 12 are fixed. Further, a head 34 of each damper 12 is attached at a part of the pickup unit 15, and the pickup unit 15 is supported in a floating state in relation to the lower frame 11 through these dampers 12. Furthermore, as shown in FIG. 4, the circuit substrate 16 at the right side of the pickup unit 15 in the drawing is attached to the bottom plate 22.

Five switches in the control circuit are arranged on the circuit substrate 16. A first switch 35 detects when either a large or small disc is inserted from the disc insertion port 2. A second switch 36 detects when either a large or small disc is loaded completely on the turntable 13. A third switch 37 detects when a large disc D1 is discharged. A fourth switch 38 detects when a small disc D2 is discharged. A fifth switch 39 as a disc insert detection switch detects when either a large or small disc is inserted within the disc player.

Meanwhile, the right side plate 24 of the lower frame 11 is a bent piece 40 where the rear is bent inward, and a loading motor 41 that is a part of the loading mechanism 10 is loaded at the bent piece 40. The loading motor 41 is connected to the control circuit on the circuit substrate 16 by wires. A worm gear 43 is loaded at a shaft 42 of the loading motor 41. Further, at the interior surface of the right side panel 24, a lower gear group 44 is equipped which receives the rotation of the worm gear 43.

Figure 5:
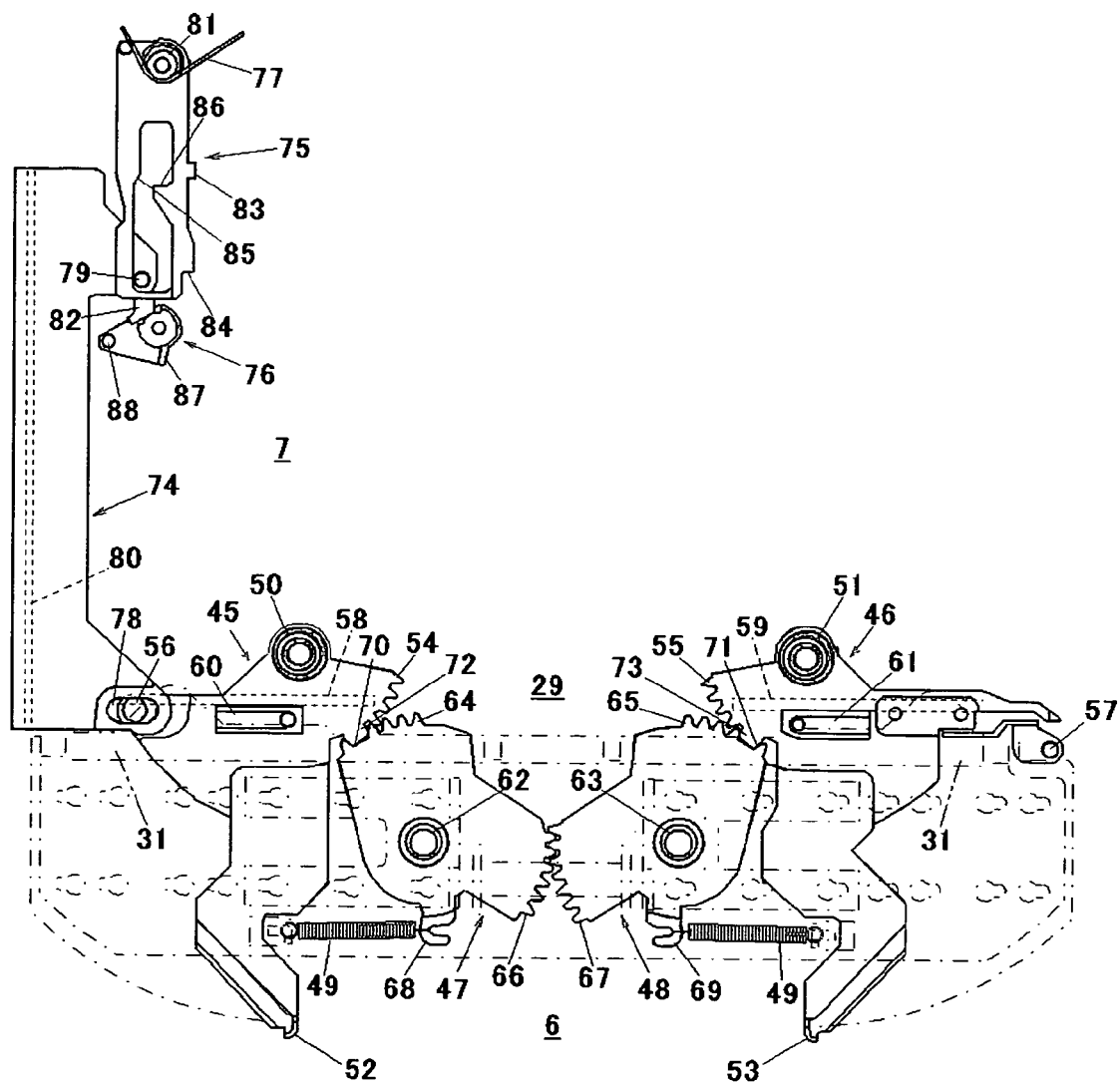
FIG. 5 is a top plan view showing a disc detection mechanism and a disc size determination mechanism.

FIG. 5 is a top plane view showing the disc detection mechanism 6 and the disc size determination mechanism 7. The disc detection mechanism 6 comprises a pair of right and left and horizontally rotating disc detection members 45, 46, a pair of right and left partial gears 47, 48 constituting an interlocking mechanism, and a pair of right and left coil springs 49. The disc detection mechanism 6 is installed on the lower surface of the first mounting unit 29 and the upper surface of the second mounting unit 28.

The disc detection members 45, 46 detect whether an inserted disc size is large or small and are thereby mounted with the ability to rotate freely respectively at spindles 50, 51 which protrude to the lower surface of the first mounting unit 29, and extend to the vicinity of the disc insertion port 2 passing through the upper surface side of the second mounting unit 28 from the notch 31, and which have detection units 52, 53 (refer to FIG. 2) which extend downward at each extended end. Both disc detection members 45, 46 have the ability to rotate freely within the range of the notch 31, and maintain their initial position by causing a part to attach at the end of the notch 31 through the energizing force of the coil spring 49. Further, the detection members 45, 46 have spindles 50, 51 and concentric gear units 54, 55.

Furthermore, a coupling pin 56 at the disc detection member 45 of the left side and a coupling pin 57 at the disc detection member 46 of the right side are arranged respectively. At the lower surface side of both disc detection members 45, 46, inclined ribs 58, 59 are provided which incline so as to gradually increase in height when progressing downward from the vicinity of each gear unit 54, 55 towards the vicinity of each coupling pin 56, 57. Moreover, elastic pieces 60, 61 are provided in the vicinity of the inclined ribs 60, 61, and always elastically crimped at the lower surface of the first mounting unit 29 so that the generation of rattle noise by the vibration of detection members 45, 46 can be prevented.

The pair of partial gears 47, 48 is mounted with the ability to rotate freely between both disc detection members 45 and 46 of the upper surface of the second mounting unit 28 through spindles 62, 63. Each partial gear, 47, 48 has concentric first gear units 64, 65, second gear units 66, 67, and hooks 68, 69; and the second gears 66, 67 are mutually engaged, and each first gear unit 64, 65 is respectively engaged to the gear units 54, 55 of each disc detection member 45, 46. Further, the coil spring 49 is hung between each hook 68, 69 and the second mounting unit 28; and the detection units 52, 53 of both disc detection members 45, 46 are energized in a direction to become closer to each other.

In addition, in each partial gear 47, 48, recessed units 70, 71 with one cog lacking are provided at each end of the first gear units 64, 65, and salient units 72, 73 which overlap with each gear unit 54, 55 are provided at the disc detection members 45, 46. The width measurement of the salient units 72, 73 is set to be sufficiently wider than the cog width of the gear units 54, 55, and when a disc is not inserted, the recessed units 70, 71 and salient units 72, 73 can be mutually interlocked.

These recessed units 70, 71 and salient units 72, 73 are used as a guide for alignment in order to easily attach both disc detection members 45, 46 and the partial gears 47, 48 to the second mounting unit 28 and the first mounting unit 29. Further, because the load at the start is received by the salient units 72, 73, in order to enhance the strength of the gear units 54, 55, there is no need to go to the trouble of using an expensive material or increase the thickness of the cogs.

The disc size determination mechanism 7 comprises a reciprocating member 74 which is the large disc detection means, a rotating member 75 which is the latching means, a locking member 76, and a spring 77 for energizing in order to rotate the rotating member 75. The disc size determination mechanism 7 is loaded at the lower surface side of the first mounting unit 29 at the left back location in the drawing of the disc detection mechanism 6.

The reciprocating member 74 is formed in a slender plate, and arranged so that the lengthwise direction is directed towards the disc insert/eject direction. The reciprocating member 74 at the front end has a long hole 78 which is at a right angle to the disc insert/eject direction, and the coupling pin 56 of the disc detection member 45 is engaged into the long hole 78, and operates with rotation of the disc detection member 45, and reciprocates in the disc insert/eject direction. Further, the reciprocating member 74 projects a cylindrical pin 79 upward in the vicinity of the rear end, and, on the rear surface, also has a thin wall 80 that extends the entire length in the lengthwise direction. The thin wall 80 regulates excessive bias in the left direction of the disc at the time of disc insertion and ejection.

The rotating member 75 is attached on the lower surface of the first mounting unit 29 through a spindle 81 with the ability to rotate freely at the back location in the drawing of the reciprocating member 74, and energized in the counterclockwise direction by the spring 77. This rotating member 75 is also formed in a slender plate, and arranged so that the lengthwise direction is directed towards the disc insert/eject direction with a long opening in the lengthwise direction. Furthermore, the rotating member 75 provides a hook 82 at the front end, and further provides a first latching unit 83 for latching a large disc at the middle of the right surface, and a second latching unit 84 for latching a small disc at the front end of the right surface respectively. Moreover, in the opening described above, a cam surface 85 which inclines to increase the height from nearly the center towards the back is provided at the left side surface, and a third latching unit 86 for latching the pin 79 is also provided at the right side surface.

The locking member 76 is axially supported with the ability to rotate freely at the lower surface of the first mounting unit 29, and which has a pressed wall 87 which extends from the vicinity of the rotation axis to the front, and a cylinder 88 located at the furthest position from the rotation axis and to the left side of the rotation axis, and a space where the hook 82 of the rotating member 75 can enter appropriately is provided between the pressed wall 87 and the cylinder 88.

Figure 6:
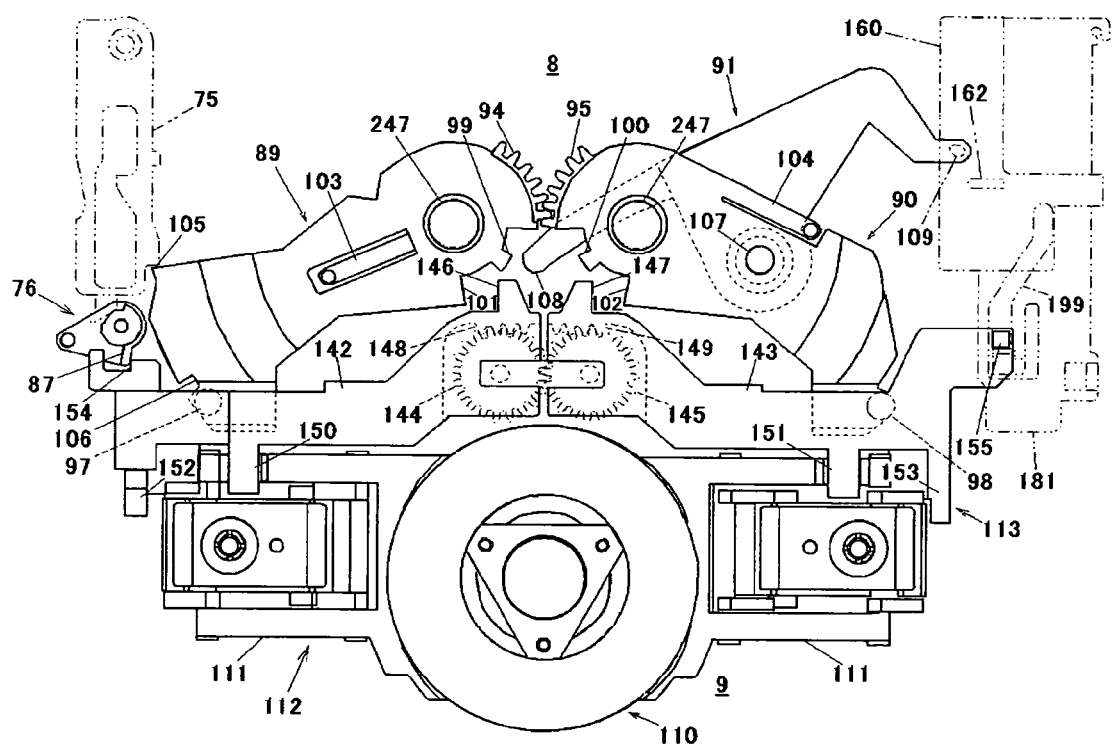
FIG. 6 is a top plan view showing a disc positioning mechanism, a clamping mechanism, and a driving means.

FIG. 6 is a top plane view showing the disc positioning mechanism 8 and the clamping mechanism 9. As shown in FIG. 6, the disc positioning mechanism 8 comprises a pair of right and left stopper members 89, 90 which is the stopper means, a trigger member 91 which is the disc loading detection means, and an energizer spring, which is not illustrated, for energizing by rotating the right side stopper member 90 in the clockwise direction in the drawing. The disc positioning mechanism 8 is arranged at the back side of the clamp mechanism 9.

The pair of right and left stopper members 89, 90 constituting stopper means is mounted with the ability to rotate freely at the spindles respectively, in other words, at the lower surface side of the first mounting unit 29 through a rotating member attachment mechanism 247 which will be described hereafter. Both stopper members 89, 90 have spindles and concentric gear units 94, 95, and which are composed so as to rotate by engaging those gear units 94, 95 in mutual synchronization. The gear units 94, 95 are thicker than other parts in order to increase the strength, and the thickened portion is shown within an arc hole 96 provided in the first mounting unit 29 (refer to FIG. 1). Both stopper members 89, 90 provide stopper units 97, 98 constituting common stoppers enabled to contact with either a large disc D1 or a small disc D2 inserted. Both stopper units 97, 98 are formed in nearly a cylindrical shape projected downward and located in the disc feeding path.

Further, each of the stopper members 89, 90 provide pressed units 99, 100 used for a large disc, pressed units 101, 102 used for a small disc, and elastic pieces 103, 104 respectively. Each elastic piece 101, 102 is crimped at all times at the lower surface of the first mounting unit 29, and which prevents the generation of a rattle noise by the vibration of each of the stopper members 89, 90. At the left side of the stopper member 89, a first latch receiving unit 105 and a recess shaped second latch receiving unit 106 is further provided. In addition, the stopper members 89, 90 are energized in the direction having the stopper units 97, 98 coming closer to each other by the energized springs which are not illustrated.

The trigger member 91 is nearly T shaped, and the lower end of the vertical piece thereof is mounted at nearly the center of the lower surface of the stopper member 90 through a spindle 107. Further, one end of the horizontal piece of the T shape is a disc contact unit 108, and a pressing unit 109 protruding downward is provided at the other end.

The clamping mechanism 9 comprises a damper 110, a damper releasing means 112 composed of a pair of linking mechanisms 111 arranged bilaterally-symmetric across the axial center line of the damper 110, and a driving means 113.

Figure 7:
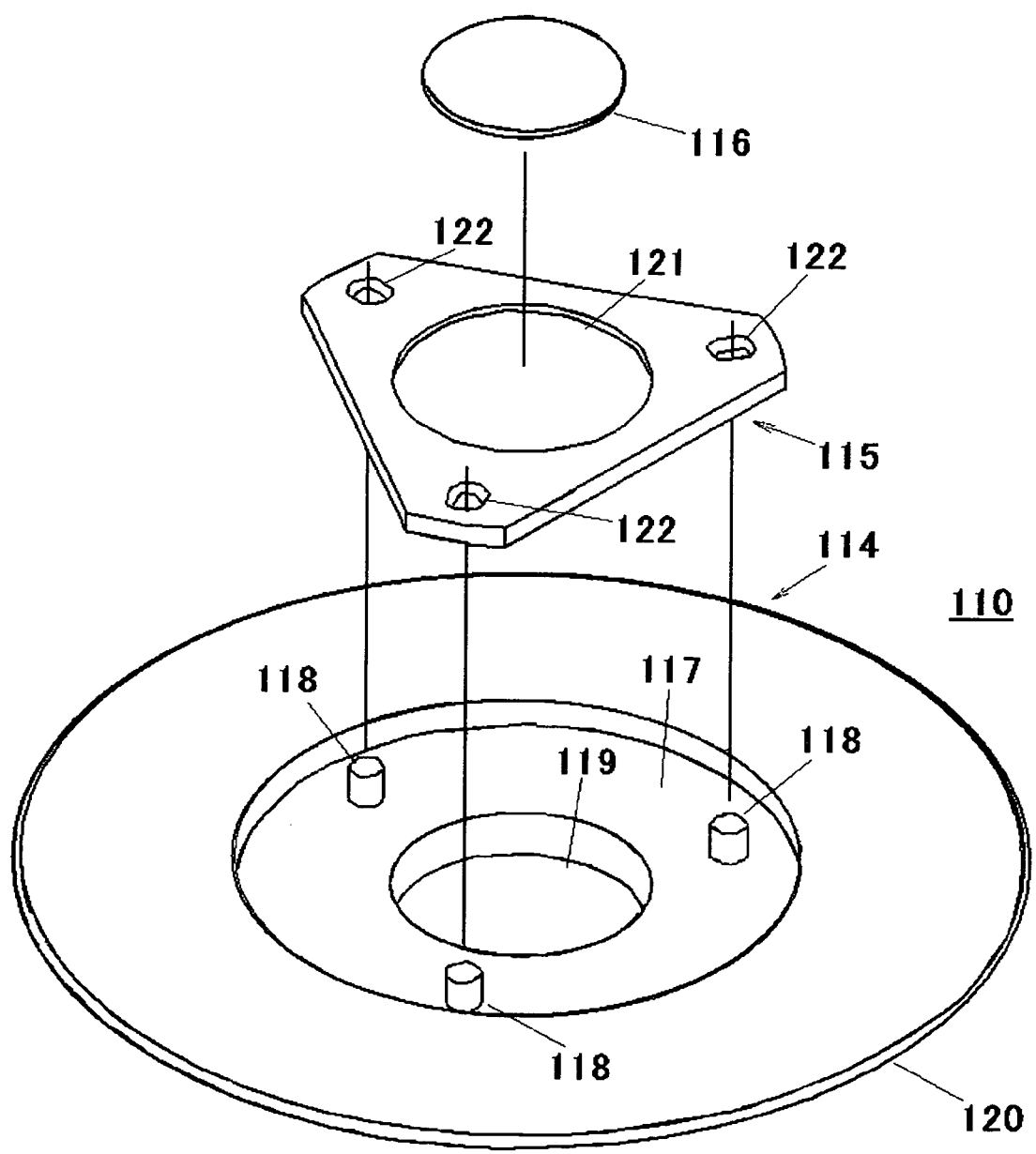
FIG. 7 is an exploded perspective view showing the composition of a clamper.

The damper 110, as shown in FIG. 7, comprises a damper member 114 made of a synthetic resin, a magnetic plate 115 which is the magnet yoke embedded in the turntable 13, and a felt 116 applied to the upper surface of the magnetic plate 115.

The damper member 114 provides a flat surface unit 117 where the upper surface center is low for only that thickness of the magnetic plate 115, a plurality of protrusions 118 arranged equiangularly in a circumferential direction at this flat surface unit 117, and a center hole 119. Further, the outer circumference surface is a taper surface 120 which becomes a proportionally narrower diameter as progressing downward (refer to FIG. 25).

Meanwhile, the magnetic plate 115 is nearly a triangle shape, and which has a semi-hit unit 121 which protrudes downward so as to engage with the center hole 119 of the damper member 114 and the small holes 122 which have the same number of protrusions 118. Further, after the protrusions 118 of the damper member 114 are inserted into the small holes 122 respectively and placed on the flat surface unit 117, the tip ends of the protrusions 118 are flattened and attached to the damper member 114. In addition, the method for attaching the damper member 114 and the magnetic plate 115 is not limited to that described above, and a binding material may be used, or ultrasonic welding may be used.

The felt 116 can be pasted on the upper surface of the semi-hit unit 121 directly if the adhesive sheet is pasted on the lower surface. The thickness of the felt 116 is set to be slightly higher than the upper surface of the damper 114 and the magnetic plate 115.

Figure 8:
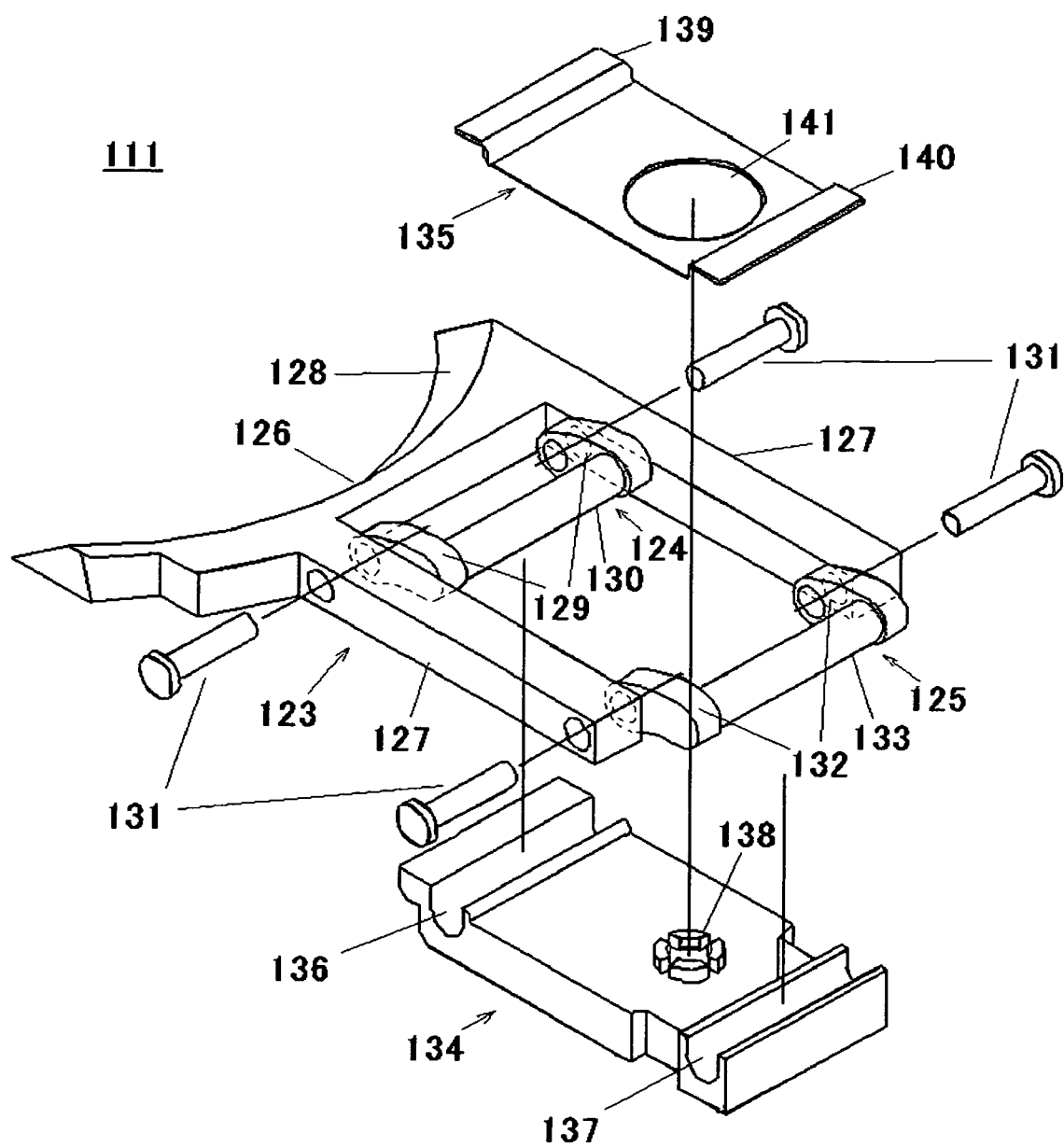
FIG. 8 is an exploded perspective view showing a linking mechanism.

Each of the linking mechanisms 111 comprises a damper releasing member 123, a front linking member 124, and a rear linking member 125 as shown in FIG. 8.

The releasing member 123 extends a pair of mutually parallel arms 127 from the salient surface side of a circular arc unit 126, and the recessed surface side of the circular arc unit 126 is the taper surface 128 which becomes a proportionally narrower diameter as progressing downward.

The front linking member 124 is constructed so that one end of a pair of legs 129 is coupled with the cylinder 130 and both legs 129 are mutually parallel; and the other end of each of the legs is mounted with the ability to rotate freely at the inner surface of each arm 127 and in the vicinity of the circular arc unit 126 through a metallic rotation or rotational axis 131. Further, the rear linking member 125 is also constructed so that one of each end of a pair of legs 132 is coupled with the cylinder 133 and both legs 132 are mutually parallel; and the other end unit of each leg 132 is mounted with the ability to rotate freely at the inner surface of each arm 127 and the vicinity of the end unit through the metallic rotation axis 131. The link span between the front linking member 124 and the rear linking member 125 are the same. In addition, the "link span" here indicates a space between the rotation axial line in relation to the upper frame 5 and the rotation axial line in relation to the releasing member of the front or rear linking member 124, 125. The linking member 111 constituted in such manner is attached to the lower surface of the first mounting unit 29 through a nearly rectangular parallelepiped base 134 and a sheet metal 135 making a rectangular attachment plate.

The base 134 has grooves 136, 137 which are parallel to each other at both ends of the upper surface, and a fixed axis 138 which is circumferentially segmented in four directions is provided in a protruded manner between both grooves 136, 137.

The sheet metal 135 is constituted so that the right and left edges are bent upwards once and bent horizontally outward along the way and making these as pressing units 139, 140, and a large hole 141 is provided in the middle area.

Figure 9:
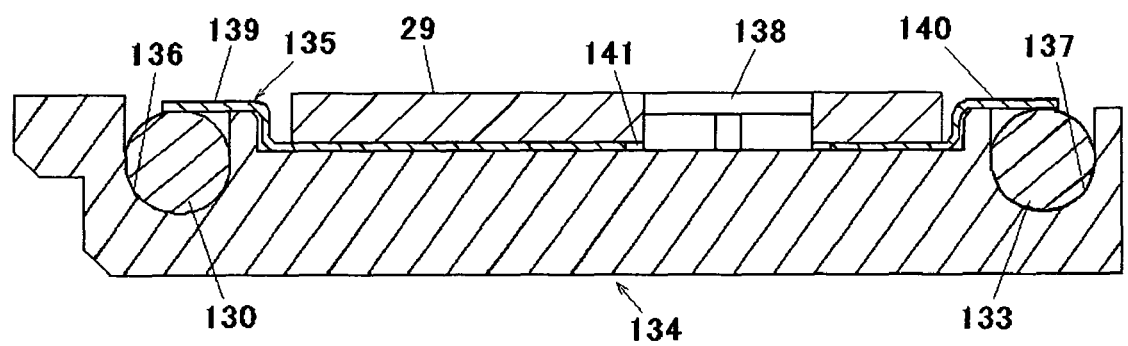
FIG. 9 is a cross-sectional view showing a portion of the linking mechanism.

As shown in FIG. 9, after each of the cylinders 130, 133 of the front linking member 124 and rear linking member 125 are engaged in the grooves 136, 137 of the base 134 with the ability to revolve freely, the sheet metal 135 is superimposed on the upper surface of the base 134, and then, the pressing units 139, 140 of the sheet metal 135 are laid on each of the cylinders 130, 133. Subsequently, the fixed axis 138 of the base 134 is engaged into the attachment hole provided at the first mounting unit 29 through the large hole 141 of the sheet metal 135, and the linking mechanism 11 is attached at the lower surface of the first mounting unit 29.

The driving means 113, as shown in FIG. 6, is arranged between the damper releasing means 112 and the disc position mechanism 8, and which comprises a pair of right and left transferring members 142, 143, and a pair of right and left synchronizing gears 144, 145. Both transferring members 142, 143 are slender, and the lengthwise direction is facing an orthogonal direction in relation to the disc insert/eject direction, while being arranged laterally symmetrical on the same straight line, and mounted at the lower surface of the first mounting unit 29 with the ability to transfer in the lengthwise direction. Further, the synchronizing gears 144, 145 are mounted on the lower surface of the first mounting unit 29 between both transferring members 142, 143.

Each of the transferring members 142, 143 has pressing pieces 146, 147 and racks 148, 149 in the vicinity of one end adjacent to each other, and each of the racks 148, 149 are engaged to the corresponding synchronizing gears 144, 145 respectively so as to move synchronizing in reverse direction from each other. And then, when both transferring members 142, 143 move in the separating direction, the pressed units 99, 100 used for a large disc or pressed units 101, 102 used for a small disc of the stopper members 89, 90 are pressed by the pressing pieces 146, 147 so that the left side stopper member 89 can rotate in the clockwise direction, and the right side stopper 90 can rotate in the counterclockwise direction in a synchronized motion.

Further, in the vicinity of the other end of each of the transferring members 142, 143, first pressing units 150, 151 which lower the releasing member 123 by pressing the leg 132 of each of the rear linking member 125 at the time of moving in the separating direction, and second pressing units 152, 153 which raise the releasing member 123 by pressing the leg 132 at the time of moving towards each other are provided. Furthermore, a pressing unit 154 is also provided at the left side transferring member 142, for rotating the locking member 76 in the clockwise direction in FIG. 6 by pressing the pressed wall 87 of the locking member 76 at the time of moving in the separating direction. Moreover, an engagement protrusion 155 is formed at the lower surface of the other end unit of the right transferring member 143.

Figure 10:
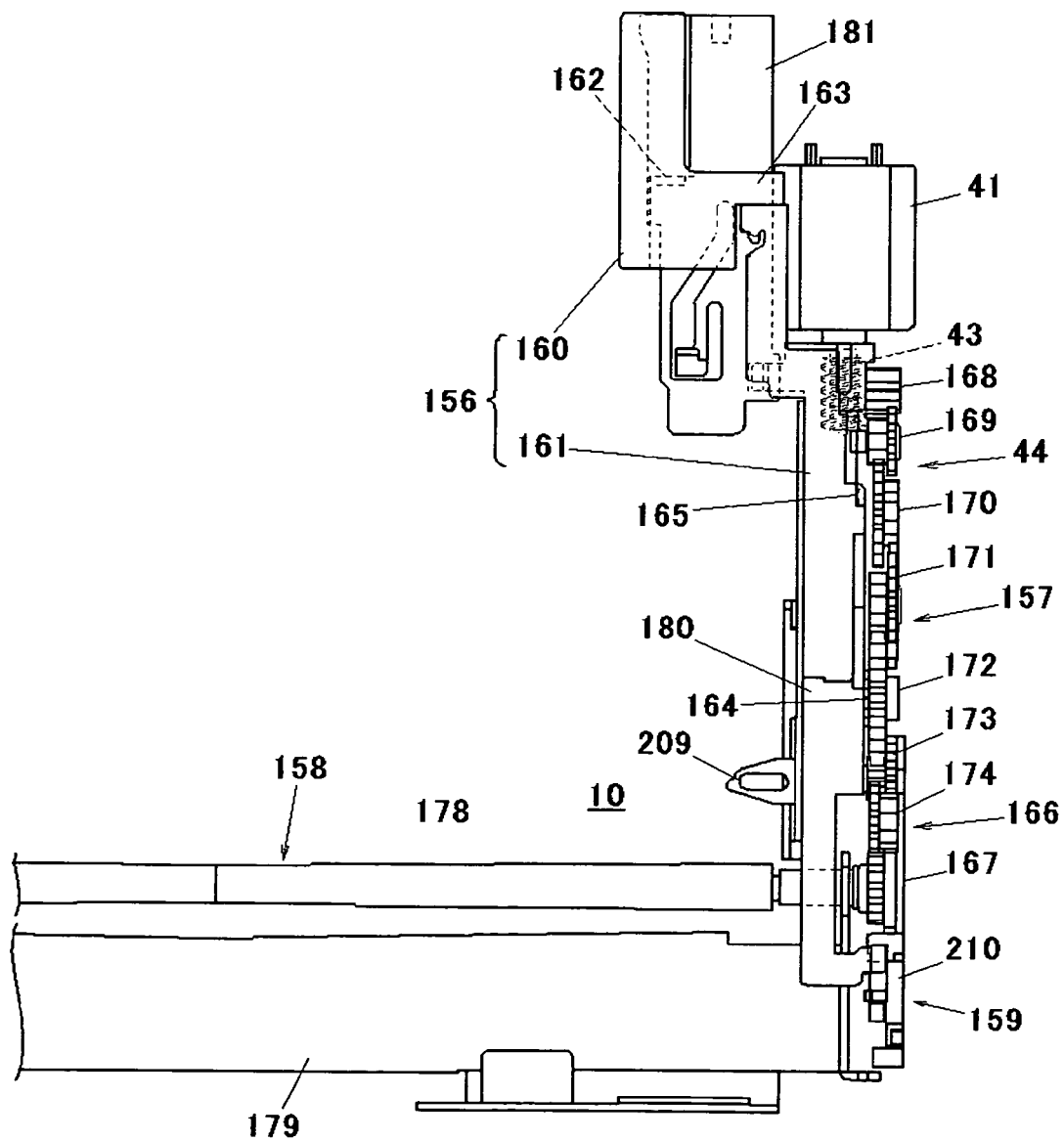
FIG. 10 is a top plan view showing a loading mechanism.

The loading mechanism 10 comprises, as shown in FIG. 10, an activating means 156, a power transfer mechanism 157, a feeding means 158, a detection means 159, and the loading mortar 41.

The activating means 156 comprises a sliding member 160 arranged at the right back area of the lower surface of the first mounting unit 29, and a guidance rack plate 161 arranged at the right center area of the lower surface of the first mounting unit 29, and both of them have the ability to move in the disc insert/eject direction.

The sliding member 160 is a thin plate made of synthetic resin, and the pressed unit 162 is formed at the lower surface side, and the pressed unit 162 slides in the disc eject direction pressed by the pressing unit 109 of the trigger member 91. Further, a protruding unit 163 which protrudes downward is provided at the right edge in the drawing.

Figure 12:
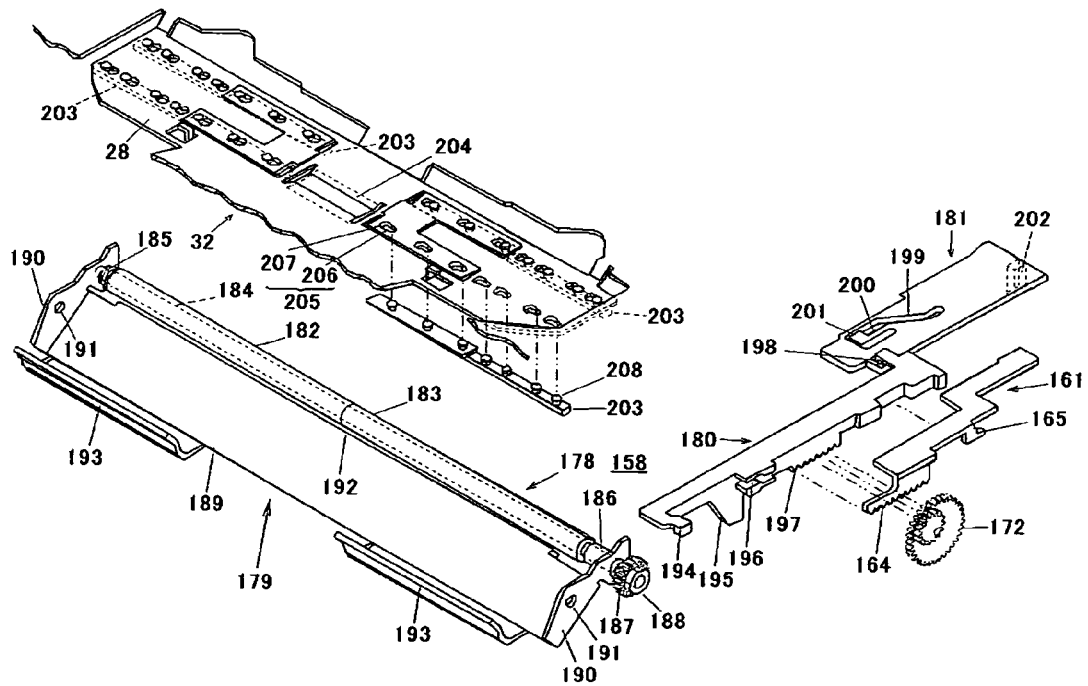
FIG. 12 is an exploded perspective view showing the composition of a feeding means and a disc guide.

The guidance rack plate 161 is a thin plate made of synthetic resin in the shape of a crank, and which has a rack 164 at the lower edge of the bottom portion within the drawing and a hook 165 near the center area (refer to FIG. 12). When the sliding member 160 slides towards the disc eject direction, the top end in the drawing is pressed by the protruding unit 163 of the sliding member 160, and moves in the same direction, and this makes the rack 164 engage with the power transfer mechanism 157.

Figure 11:
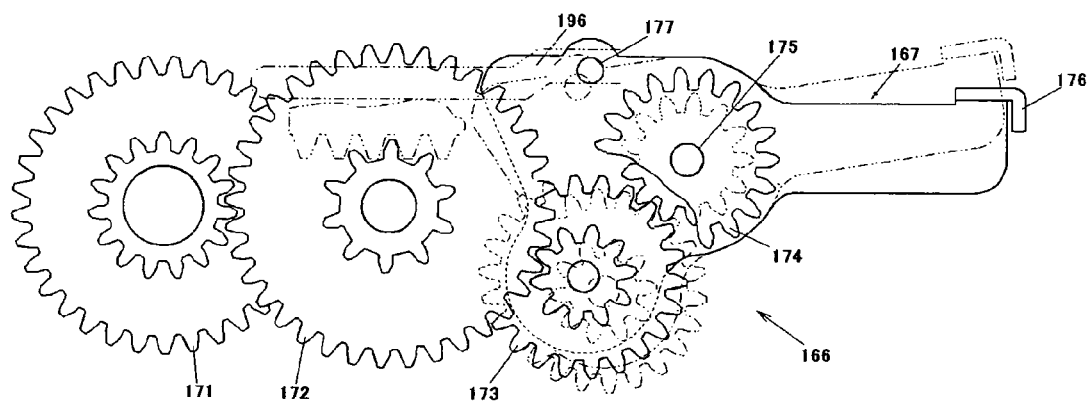
FIG. 11 is a lateral view showing the relationship between a portion of the upper gear group and a gear plate.

The power transfer mechanism 157 is based on gear groups, and which comprises a lower gear group 44 mounted on the interior surface of the right side plate 24 of the lower frame 11, an upper gear group 166 mounted on the interior surface side of the right panel 19 of the upper frame 5, and a gear plate 167 (refer to FIG. 11). Further, the lower gear group 44 is mounted in the back half of the right side plate 24 of the lower frame 11, in other words, at the lower half of the side plate; and the upper gear group 166 is mounted at the front half of the right side plate 19 of the upper frame 5, in other words, mounted at the upper half of the side plate directly or through the gear plate 167. The lower half of the side panel and the upper half of the side panel are interlocked as shown in FIG. 1, and the lower gear group 44 and the upper gear group 166 are mesh connected. The feeding means 158 is driven by the loading motor 41 through the power transfer mechanism 157.

The lower gear group 44 comprises a first gear 168, a second gear 169, and a third gear 170 which are all axially supported at the interior surface of the right side plate 24 of the lower frame 11. These are all two-step gears, and the first gear 168 is engaged with the worm gear 43 by having the large gear of the first step as the helical gear. A large gear which is the first step of the second gear 169 is engaged to a small gear which is the second step of the first gear 168, and a large gear which is the first step of the third gear 170 is engaged with a small gear which is the second step of the second gear 169, so that the rotation of the loading motor 41 can be slowed in stages.

The upper gear group 166, as shown in FIG. 11, comprises a fourth gear 171, a fifth gear 172, a sixth gear 173, and a seventh gear 174 which are all two-step gears. The fourth gear 171 and the fifth gear 172 are axially supported directly in the interior surface of the right side plate 19; however the seventh gear 174 together with the gear plate 167 are axially supported in the interior surface of the right side plate 19 through the mutual spindle 175; and sixth gear 173 is axially supported at the gear plate 167, and the large gear which is the second step is engaged at all times with the small gear which is the first step of the seventh gear 174. The large gear which is the first step of the fourth gear 171 is engaged with the small gear which is the second step of the fourth gear 171 so that the rotation of the third gear 170 can be further slowed in stages and transferred to the fifth gear 172. The small gear which is the first step of the sixth gear 173 has the ability to detach in relation to the large gear which is the first step of the fifth gear 174, so that the rotation of the fifth gear 172 can be transferred to the seventh gear 174 by increasing the speed at the sixth gear 173 at this time. Further, the worm gear 43 loaded on the loading motor 41, first gear 168, second gear 169, third gear 170, fourth gear 171, and fifth gear 172 constitute an operation means.

The gear plate 167 is a metallic plate, and the right end in FIG. 11 is bent inward making a slide contact receiving unit 176, and an engaging pin 177 is provided near the center in the drawing. The gear plate 167, the engaging pin 177, and the sixth gear 173 which is axially supported to the gear plate 167, constitute a clutch means which suitably interrupts the power transfer path between the operation means and a roller 178.

The feeding means 158, as shown in FIG. 12, comprises the roller 178, a roller supporter 179, a slider 180 to control the roller position, a cam plate 181, and the disc guide 32.

The roller 178 is constituted by inserting a metallic roller axis 184 into a pair of taper cylinders 182, 183 made of synthetic rubber which gradually becomes smaller in size from the outer end to the inner end. Both ends of the axis 184 protrude from the outer end of the taper cylinders 182, 183, and a small collar 185 is attached at one end of the protruding axis 184, and a large collar 186 and a roller gear 187 are attached at the other end. The cog width of the roller gear 187 is about 2 mm, and at the outer surface of the cogs, a cylindrical collar 188 is placed.

The roller supporter 179 is made of a metallic plate, and has right and left side panels 190 which are formed by bending upward at the right and left ends of a flat plate 189 which is laterally long, and these right and left side panels extend from the flat plate 189 to the back. The right and left side panels 190 have a shaft hole 191 at nearly the middle area respectively, and each shaft hole 191 is inter-fit into the axis not illustrated that protrudes to the interior surfaces of the right and left side panels 18, 19 on the frame 5, and is mounted with the ability to rotate freely vertically between both side panels 18, 19. Further, the small collar 185 and the large collar 186 are supported respectively by the extended portion of the right and left side panels 190, and the roller 178 is supported with the ability to rotate freely. The rear edge of the flat plate 189 is a mountain fold edge 192 which is bent towards the reverse surface. This mountain fold edge 192 is also a V shape recess which is nearly bilaterally symmetric in the drawing of the flat plate; however the inclined angle is about 1 degree which is very slight in relation to the shaft center line of the roller. Furthermore, a pair of right and left curved units 193, which are bent upward, is provided at the front edge of the flat plate 189. When the roller 178 is placed at the lower side, in other words, the disc is inserted into the playback position, these curved units 193 are placed at the upper side to plug the disc insertion port 2 and prevent a double disc insertion. In addition, the roller supporter 179 is energized at all times in the direction where the roller 178 is raised by the spring which is not illustrated.

As shown in FIG. 12, the slider 180 is a slender form and is mounted on the lower surface of the first mounting unit 29 by directing the lengthwise direction to the disc insert/eject direction with the ability to move in the disc insert/eject direction. This slider 180 has a sliding contact unit 194 at the front end in the drawing with a protruding unit at the rear side, and has an inclined surface 195 constituting a protruding cam as the roller separation unit where the front edge inclines downward as progressing to the rear side, and a cam groove 196 as the power interruption unit at the further rear side on the right side surface. The engaging pin 177 of the gear plate 167 is inserted into the cam groove 196. At the further rear side of the cam groove 196, a rack unit 197 is provided; and at the left side unit of the rear end in the drawing, an engaging unit 198 which protrudes downward is provided. The rack unit 197 selectively engages with a small gear which is the second step of the fifth gear 172. In addition, the cam groove 196 is provided in the slider 180, and the engaging pin 177 is provided on the gear plate 167 with the present Embodiment; however, it is not limited to that described above, and the pin may be provided in the slider and the cam groove may be on the plate.

The cam plate 181 is mounted on the lower surface of the first mounting unit 29, and a cam groove 199 is provided at the front half in the drawing. The cam groove 199 is formed to extend in the disc insert/eject direction, and the middle area is made to be an inclined unit which inclines to the right side as it progresses to the rear, and the engaging protrusion 155 of the transferring member 143 is inserted into the cam groove 199. The front right side wall of the cam groove 199 is composed of an elastic piece 200 which extends to the front side in the drawing, and a stopper 201 is provided at the tip of the elastic piece 200. Further, in the deepest area in the drawing, a prismatic shaped second switch pressing unit 202 protrudes downward. Furthermore, at the right side of the front end of the cam plate 181 in the drawing, a hole which is not illustrated is provided for inserting the engaging unit 198 of the slider 180 so that the cam plate 181 can move integrally with the slider 180. Moreover, a spring which is not illustrated is attached in the space with the guidance rack plate 161 so that the cam plate 181 can follow when the guidance rack plate 161 is moved by the spring energizing force. In addition, the cam plate 181 stably maintains a termination location before and after movement by a reversal spring which is not illustrated.

The disc guide 32 comprises the second mounting unit 28 of the upper frame 5 and four guiding projections 203 (only one of them is illustrated).

Each guiding projection 203 is attached at the lower surface of the second mounting unit 28 where the lengthwise direction is orthogonal to the disc insert/eject direction and mutually paired laterally by positioning at the near side and far side of the roller 178.

A bulging unit 204 where the front half of the rectangular region of the center is bulged downward, is provided in the second mounting unit 28, and a plurality of positioning holes 205 are provided at the right and left thereof in order to mount each guiding projection 203 respectively. The positioning holes 205 are formed by connecting a small circular hole 206 and a large circular hole 207, and the large circular hole 207 side is directed towards the bulging unit 204.

Each of the guiding projections 203 having the large heads provides engaging protrusions 208 in the same number as each of the positioning holes 205. A surface (lower surface) that contacts with the disc of each guiding projection 203 is inclined so as to incline upward as it progresses to the center area from the lateral end of the mounting unit 28 (moving away from the shaft center line of the roller 178) in a mounted state to the lower surface of the second mounting unit 28. In addition, each of the guiding projections 203 are composed of synthetic resins and all of them are identical forms and sizes.

In the attaching of each of the guiding projections 203, first, a plurality of engaging protrusions 208 are inserted through from the large circular holes 207 side of each of the positioning holes 205. And then, when the engaging protrusions 208 are moved to the small circular hole 206 side by sliding the guiding protrusions 203 outward while pressing against the lower surface of the second mounting unit 28, the large size heads of the engaging protrusions 208 move to the small circular hole 206 side, the engaging protrusions 208 are prohibited from slipping out from the positioning holes 205, and the guiding projections 203 are mounted on the lower surface of the second mounting unit 28.

Figure 13:
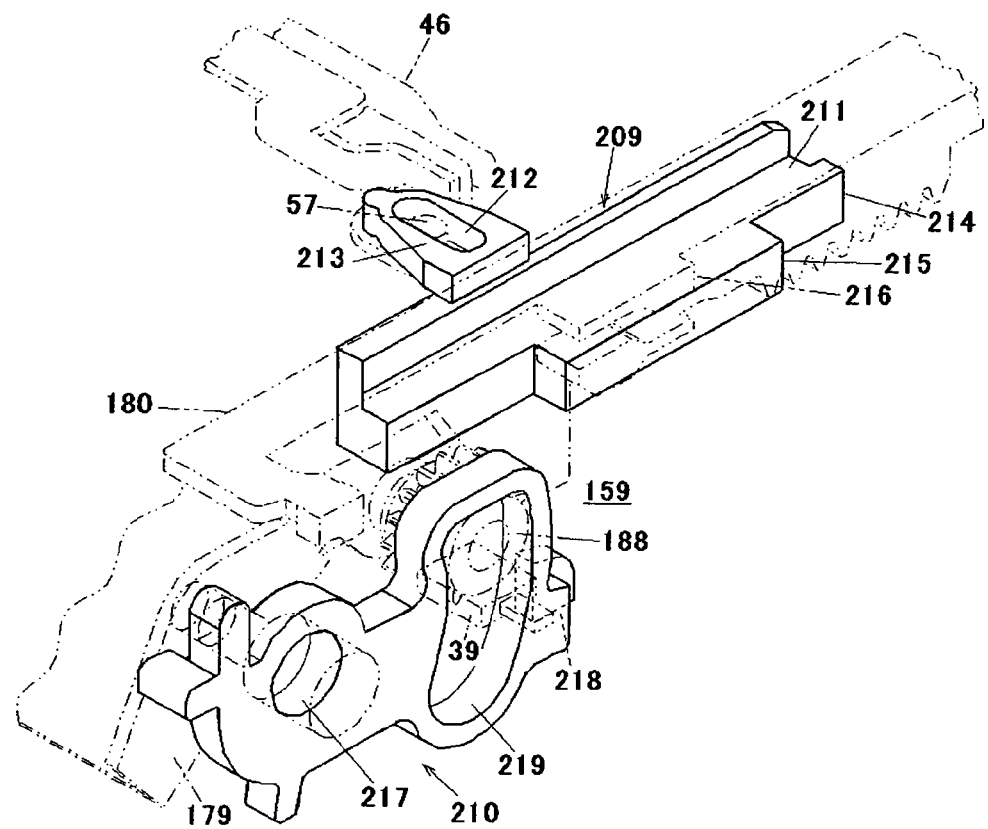
FIG. 13 is a diagrammatic perspective view showing a detection means.

The detection means 159, as shown in FIG. 13, comprises a position detection member 209 and an actuator 210 which are arranged at the front right side in FIG. 10.

The position detection member 209, as shown in FIG. 13, is arranged on the lower surface side of the first mounting unit 29 while the lengthwise direction is directed to the disc insert/eject direction, and which has a wall which protrudes upward in the left side area in the drawing of a prismatic shaped body 211, and a coupling piece 213 having a long hole 212 extending to the left side is provided at the top surface of the wall. The body 211 provides a first switch pressing unit 214 to press the first switch 35, a third switch pressing unit 215 to press the third switch 37, and a fourth switch pressing unit 216 to press the fourth switch 38 which are arranged at the circuit substrate 16. The position detection member 209 is mounted on the lower surface of the slider 180 with the ability to freely move in the disc insert/eject direction, and which inserts the coupling pin 57 of the disc detection member 46 into the long hole 212 and moves in the disc insert/eject direction by interlocking with the rotation of the disc detection member 46.

The actuator 210 has a spindle hole 217 at the front side in the drawing and is axially supported at the right side panel 19 of the upper frame 5 with the ability to rotate freely by inserting the supporting axis (indicated by the virtual line) of the roller supporter 179 to this hole 217. A fifth switch pressing unit 218 is formed at the back side in the drawing to press the fifth switch 39 (refer to FIG. 4). Further, a vertically long loop unit 219 is provided at the front side of the switch pressing unit 218 in the drawing. Within this loop unit 219, the collar 188 of the roller 178 is inserted. In order for the actuator 210 to share the supporting axis with the roller supporter 179, the spindle hole 217 needs to be located more to the front side than the roller 178; and because the fifth switch pressing unit 218 also needs to be located more to the back side than the roller 178 in order to press the fifth switch 39 located further to the back than the roller 178, the loop unit 219 which shows the collar 188 arranged at the roller axis 184 is provided so that the actuator 210 does not interfere with the roller axis 184. Further, a torsion spring which is not illustrated is hung between the roller supporter 179 and the actuator 210, and when the roller supporter 179 starts rotating by inserting a disc, the actuator 210 also follows and starts rotating so that the fifth switch 39 is pressed by the fifth switch press unit 218.

As shown in FIG. 4, the pickup unit 15 comprises a turntable 13 having a built-in magnet, a pickup 14 to playback or record the disc, a feed motor means 220 to drive the pickup 14, a pickup support means 221 to support the pickup 14, and a pickup chassis 222 for carrying these.

The pickup chassis 222 made of a metallic plate has a large opening 223 at the center, and the turntable 13, pickup 14, and the feed motor means 220 are arranged together to the inside of the large opening 223. At the three locations around the chassis 222, a damper attachment 224 is provided in which a portion is opened and is formed by stepped bend processing.

The turntable 13 is attached to the right lower area of the pickup chassis 222 in the drawing, and the center of the turntable 13 becomes nearly the center of the mechanism unit 1 of the disc player. The pickup 14 is arranged within the large opening 223 with the ability to reciprocate between the vicinity of the turntable 13 and the upper area of the pickup chassis 222 diagonally in the drawing. This pickup 14 is attached to the pickup chassis 222 through the pickup support means 221.

The feed motor means 220 comprises a feed motor 227 providing a feed screw 226 having spiral grooves, and a motor support plate 228 to support those. The motor support plate 228 fixes the feed motor 227 at one end, and supports the tip of the feed screw 226 at the other end with the ability to revolve freely; and the feed screw 226 is attached on the rear side of the pickup chassis 222 accommodating the moving direction of the pickup 14.

The pickup support means 221 comprises a main-guide 229 and a sub-guide 230 arranged so as to be parallel to each other, a main-guide tracking adjustment means 231 and a sub-guide tracking adjustment means 232, and a pickup feed plate 233. Because the location of one end of the main-guide 229 is fixed on the lower surface side of the pickup chassis 222, the main-guide tracking adjustment means 231 exclusively adjusts the tracking by only the other end of the main-guide 229.

Figure 14:
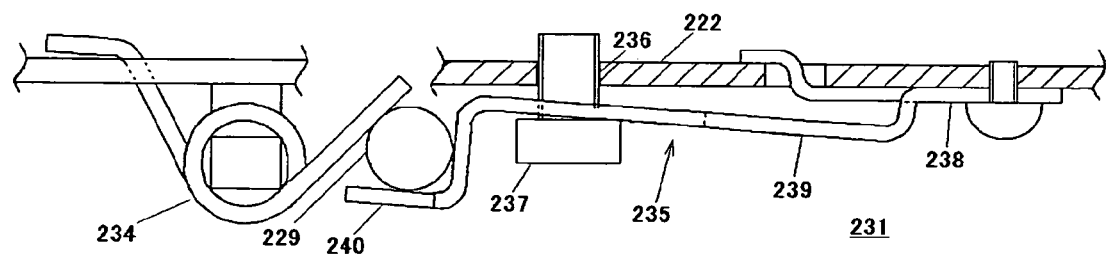
FIG. 14 is a lateral view showing the composition of a main tracking adjustment means.

The main-guide tracking adjustment means 231, as shown in FIG. 14, comprises a coil spring 234 to energize the main-guide 229 in the tracking direction at a uniform elastic force, an adjusting plate 235 made of a blade spring to receive the elastic force of the spring 234 by the opposite side of the main-guide 229 to regulate the tracking direction movement of the main-guide 229, and a main-guide adjust screw 237 which is screwed into the rear surface of the pickup chassis 222 via a through hole 236 (refer to FIG. 15) provided at a portion of the adjusting plate 235.

Figure 15:
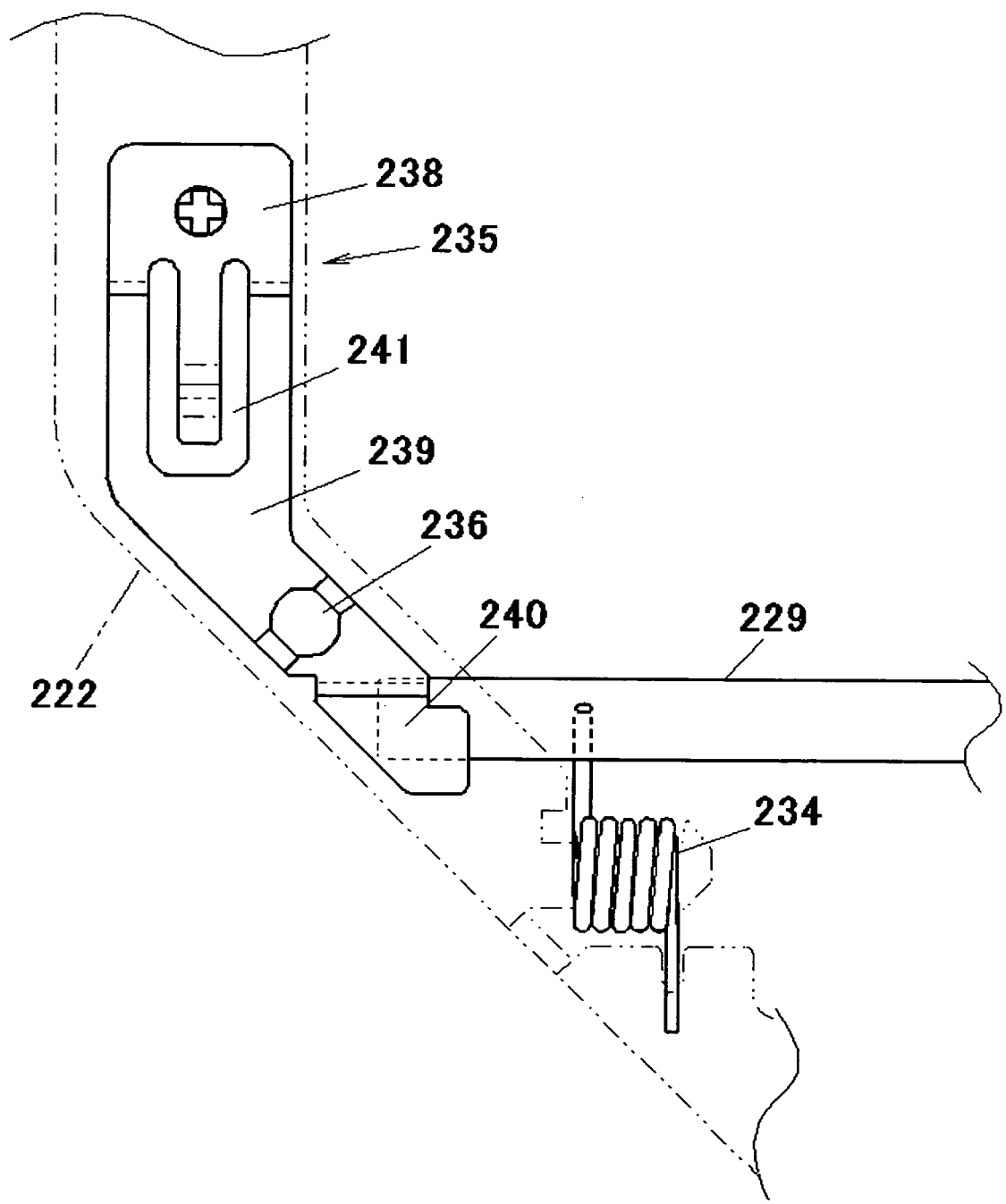
FIG. 15 is a top plan view showing the composition of the main tracking adjustment means.

The adjusting plate 235 has a three-staged flat surface which includes, in order from the top of the drawing, an upper stage 238, a middle stage 239, and a lower stage 240. The upper stage 238 is fixed to the lower surface side of the pickup chassis 222, and the lower stage 240 is attached to the main-guide 229 from the lower side so that the main-guide 229 can be supported. As shown in FIG. 15, the middle stage 239 has a hole 241 resembling a U shape for providing flexibility to the area connected with the upper stage 238, and further has the through hole 236 at in an area near to the lower stage 240.

Adjustment of the main-guide 229 in the tracking direction is performed by moving the main-guide 229 in the vertical direction in FIG. 14 through fastening/loosening of the main-guide adjust screw 237.

Figure 16:
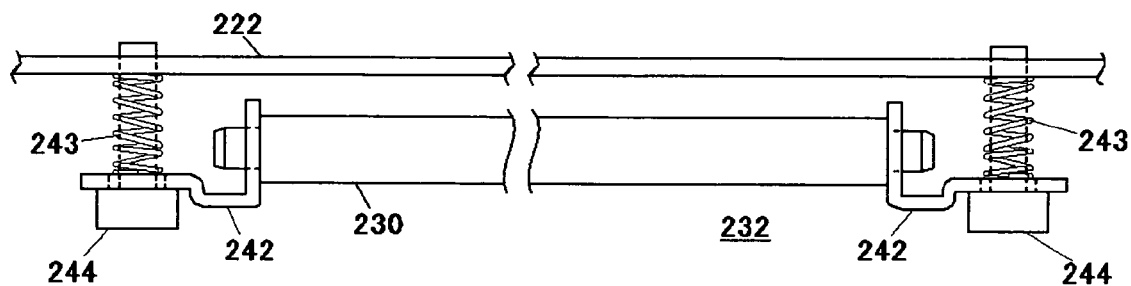
FIG. 16 is a lateral view showing the composition of a sub-tracking adjustment means.

The sub-guide tracking adjustment means 232, as shown in FIG. 16, comprises a pair of right and left sub-guide supporting plates 242 to support both ends of the sub-guide 230, a pair of right and left compressed springs 243 arranged at both ends of the sub-guide 230, a pair of right and left sub-guide adjust screws 244 screwed into the rear surface side of the pickup chassis 222 by passing through the hole provided at the sub-guide supporting plate 242.

One end of both sub-guide supporting plates 242 is bent upward respectively in the drawing, and the tip of the sub-guide 230 is fit together and supported by insertion into the hole provided at the bending member. Further, the adjust screw 244 is inserted through the compressed spring 243 between the pickup chassis 222 and the sub-guide supporting plate 242.

The adjustment of the sub-guide 230 in the tracking direction is performed by moving the sub-guide 230 vertically by fastening/loosening each of the sub-guide adjust screws 244.

Further, with the pickup feed plate 233, as shown in FIG. 4, one end is fixed at the pickup 14, and a screw head 246 formed by cut-bending is provided at the other end, and then the screw head 246 is engaged in the spiral groove of the feed screw 226. By so doing, the power of the feed motor 227 is transferred to the pickup feed plate 233 from the feed screw 226, and the pickup 14 is driven by the power of the feed motor 227.

Figure 17:
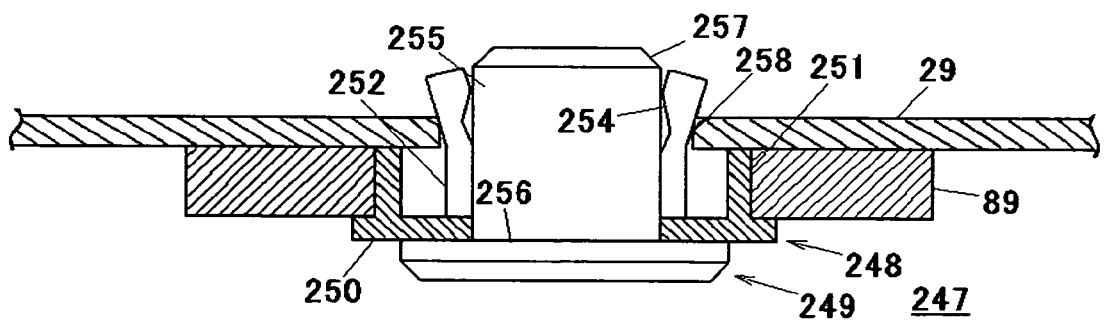
FIG. 17 is a cross-sectional view showing a rotating member attachment mechanism in a state of use.

A rotating member attachment mechanism 247 comprises a supporting member 248 and a fixing member 249 as shown in FIG. 17. Both the supporting member 248 and the fixing member 249 are formed of synthetic resin.

Figure 18:
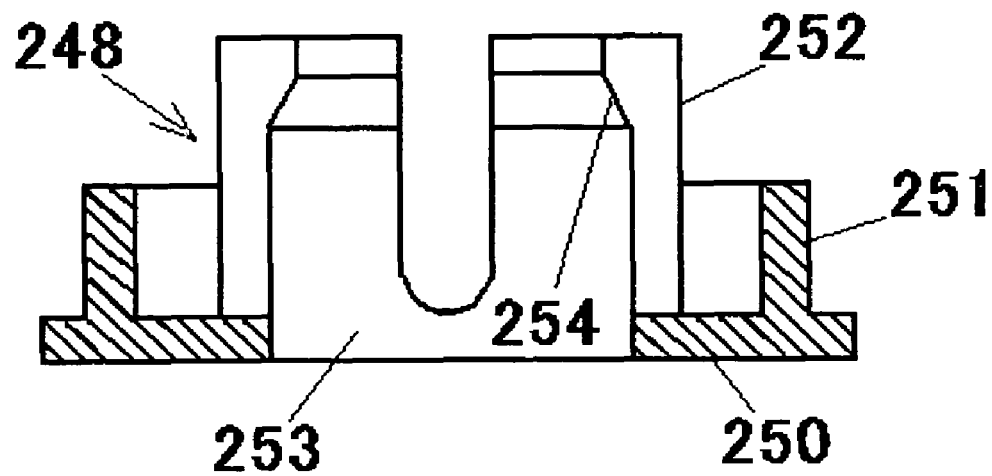
FIG. 18 is a cross-sectional view showing a support member.

The supporting member comprises a circular shaped plate 250, a support cylinder 251, and a fixing tube 252 as shown in FIG. 18. The support cylinder 251 protrudes on one surface of the circular shaped plate 250 and on the same axis with a circular center hole 253 of the circular shaped plate 250; and the fixing tube 252 which protrudes longer than the support cylinder 251 on one surface of the circular shaped plate 250 by connecting to the circular center hole 253. The fixing tube 252 has a taper surface 254 at the inner circumference of the top end which reduces in size to a smaller diameter towards the top end, and which also is circumferentially segmented in four directions. The taper surface 254 is formed further to the front of the inner circumference than the top end of the support cylinder 251.

Figure 19:
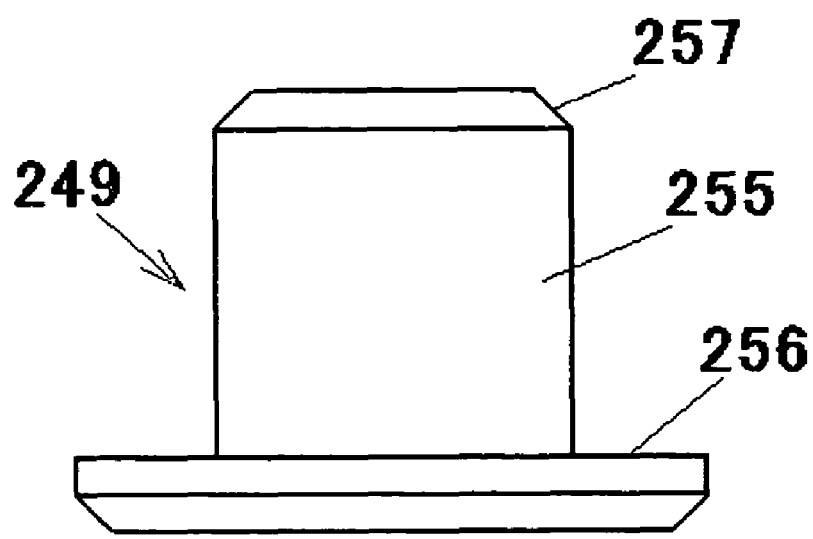
FIG. 19 is a lateral view showing a fixed member.

The fixing member 249, as shown in FIG. 19, comprises a pressing unit 255 and an end plate 256 provided at the rear anchor of the pressing unit 255. The pressing unit 255 forms a cylindrical shape, and the top rim is a tapered slide contact rim 257 which is inserted into the fixing tube unit 252 through the circular center hole 253 of the circular shaped plate 250.

The spindles 50, 51, 62, 63 in FIG. 5 and the spindle 107 in FIG. 6 may also mount both disc detection members 45, 46, both partial gears 47, 48, and both stopper members 89, 90 to the first mounting unit 29 as shown in FIG. 3 by the rotating member attachment mechanism 247. Likewise, the trigger member 91 may be mounted to the second mounting unit 28.

FIG. 17 shows an example of the attachment method of the rotating components by the rotating member attachment mechanism 247 to describe how the stopper member 89 is mounted to the first mounting unit 29 of the upper frame 5. As shown in FIG. 17, first, the support cylinder 251 is engaged to the hole provided in the stopper member 89. Next, the portion longer than the support cylinder 251 of the fixing tube 252 is engaged to a circular fixing hole 258 provided in the first mounting unit 29. When the pressing unit 255 of the fixing member 249 is engaged into the fixing tube 252 while the slide contact rim 257 of the pressing unit 255 contacts with the taper surface 254 of the fixing tube unit 252, and in that state the fixing member 249 is compressed until the end plate 256 is attached to the circular shaped plate 250, the taper surface 254 is pressed by the slide contact rim 257, and the top end of the fixing tube unit 252 slightly rolls back outward. By so doing, the top end of the fixing tube 252 is extended outward further than the circular fixing hole 258 of the first mounting unit 29, and the supporting member 248 is fixed tightly to the first mounting unit 29, and the stopper member 89 is mounted with the ability to freely rotate in relation to the first mounting unit 29.

An operation of the mechanism unit 1 of the disc player is described hereafter.

First, a description will be given of the operation until a disc inserted from the disc insertion port 2 is loaded into the playback position.

Figure 20:
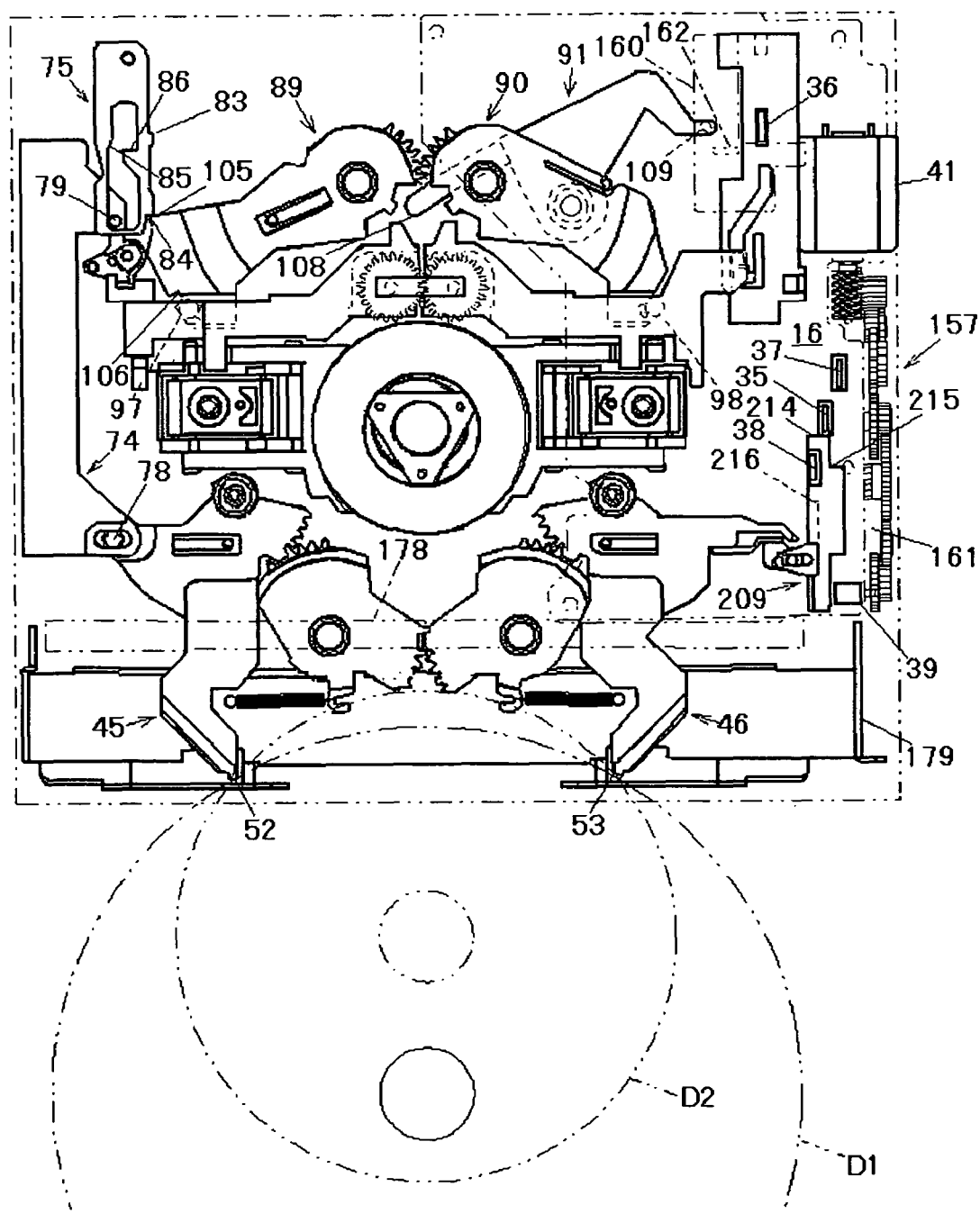
FIG. 20 is a top plan view showing the disc player in a state of use.
Figure 21:
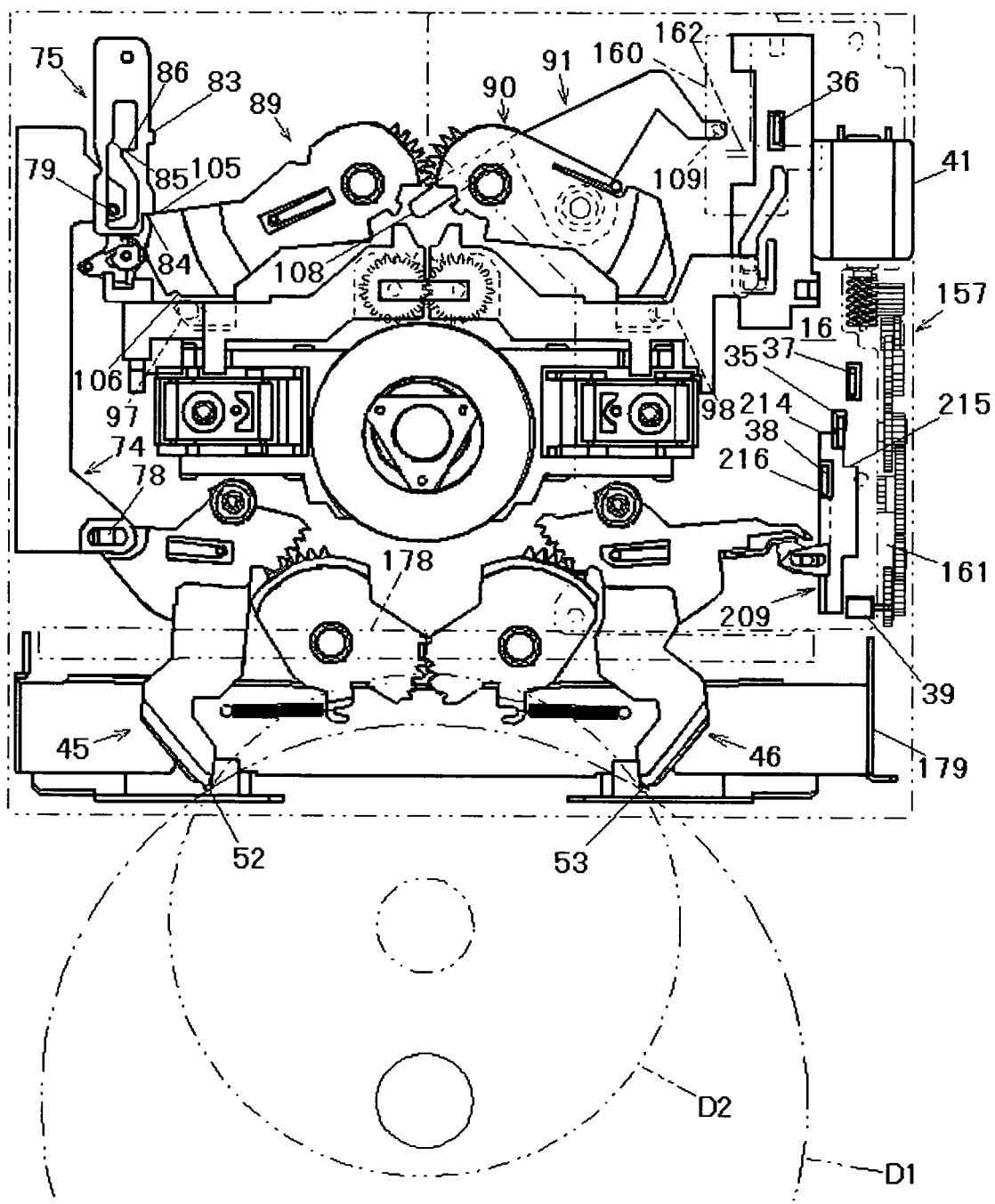
FIG. 21 is a top plan view showing the disc player in a state of use.

FIG. 20 shows the state in which a large disc D1 or a small disc D2 is inserted from the disc insertion port 2 between the detection units 52, 53 of the disc detection member 45, 46 and the circumference of the disc makes contact with both detection units 52, 53. From this state, as shown in FIG. 21, when the disc is inserted while expanding the interval between the detection units 52, 53 by pushing the disc, the disc detection members 45, 46 start rotating. The disc detection member 45 of the left side is connected to the reciprocating member 74, and the disc detection member 46 of the right side is connected to the position detection member 209, so if both disc detection members 45, 46 rotate in a direction which causes the corresponding detection units 52, 53 to separate, then the reciprocating member 74 and the position detection member 209 move to the disc insert=direction.

When the position detection member 209 moves to the disc insert direction, first, the fourth switch pressing unit 216 of the member 209 presses the fourth switch 38 to turn on. When the position detection member 209 further moves to the disc insert direction, the first switch pressing unit 214 of the member 209 presses the first switch 35 to turn on, and the motor 41 is activated by detecting the disc insertion.

The rotation of the motor 41 is transferred to roller 178 through the power transfer mechanism 157, and the roller 178 starts rotating in the clockwise direction in FIG. 12. When the disc is inserted between the roller 178 and the guide projection 203 (refer to FIG. 12) of the disc guide 32, the roller 178 is pushed downward by the disc, and the roller supporter 179 barely rotates in the clockwise direction in FIG. 12 centering around the shaft hole 191. While the roller 178 is pressed downward, the actuator 210 also rotates in the clockwise direction in FIG. 13 by the energizing force of the spring not illustrated which is placed through the space with the actuator 210, the fifth switch pressing unit 218 presses the fifth switch 39. By so doing, the fifth switch 39 turns on and the insertion of the disc is detected. The disc is clamped by the roller 178 and the disc guide 32 and fed by the rotation of the roller 178.

Figure 22:
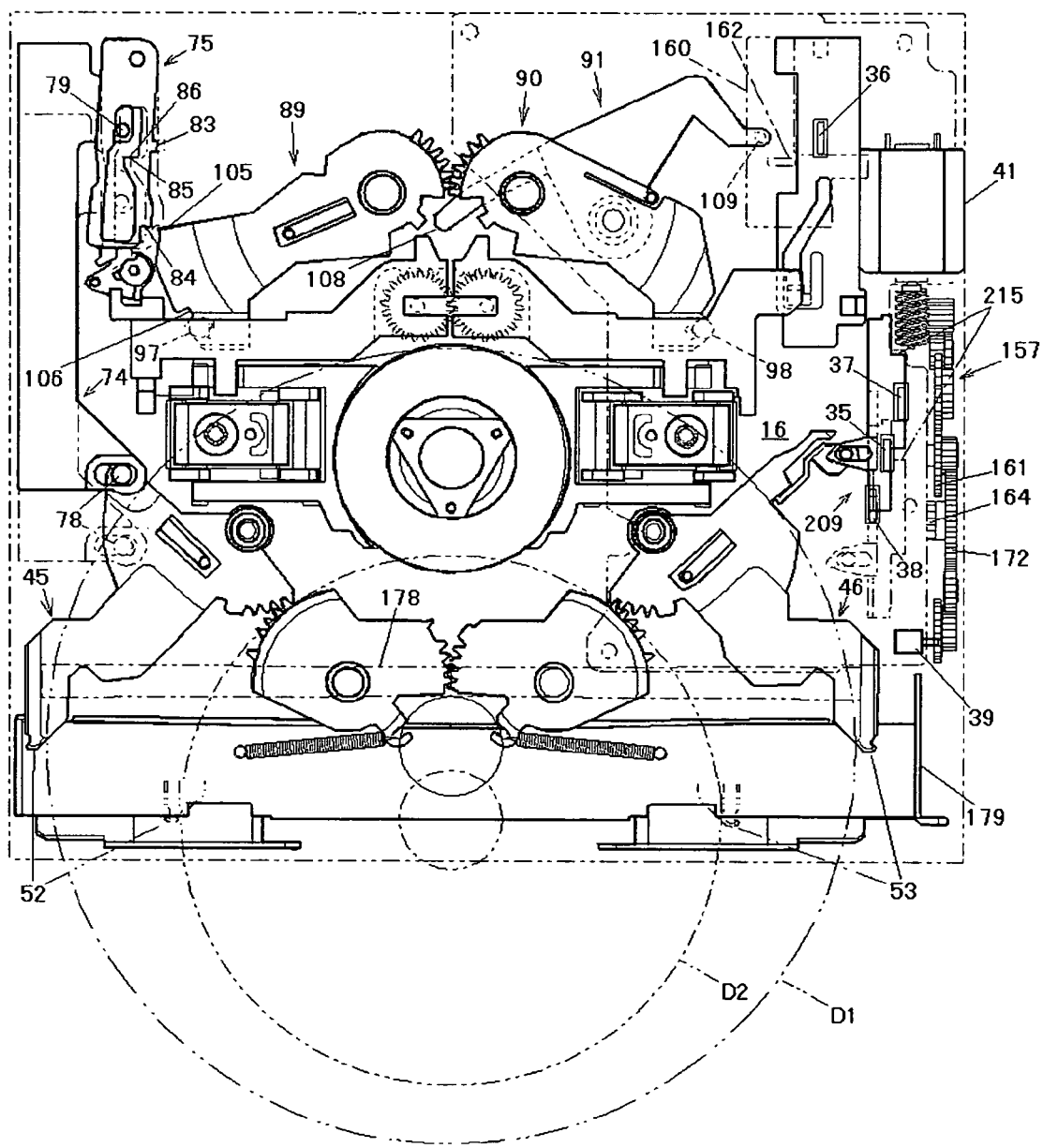
FIG. 22 is a top plan view showing the disc player in a state of use.

FIG. 22 shows the state in which a large disc D1 or small disc D2 is fed by the roller 178, and the center of the disc arrives between both detection units 52, 53. First, when a small disc D2 is inserted, even if the center of the small disc D2 arrives between both detection units 52, 53, the pin 79 will not reach to the cam surface 85 of the rotating member 75 because the rotation amounts of both disc detection members 45, 46 are small and the moving amounts of the reciprocating member 74 are also small. Further, because the displacement of the position detection member 209 is also small, the third switch pressing unit 215 does not move to the position of the third switch 37, so the third switch 37 maintains the off state. Meanwhile, when a large disc D1 is inserted, both disc detection members 45, 46 rotate in large measure before the center of the large disc D1 arrives between both detection units 52, 53. Therefore, the reciprocating member 74 moves a large amount, and the pin 79 slides and makes contacts with the cam surface 85 of the rotating member 75 causing the member 75 to rotate in the clockwise direction in the drawing. Further, the displacement of the position detection member 209 is also large, and the third switch 37 turns on by the third switch pressing unit 215.

Figure 23:
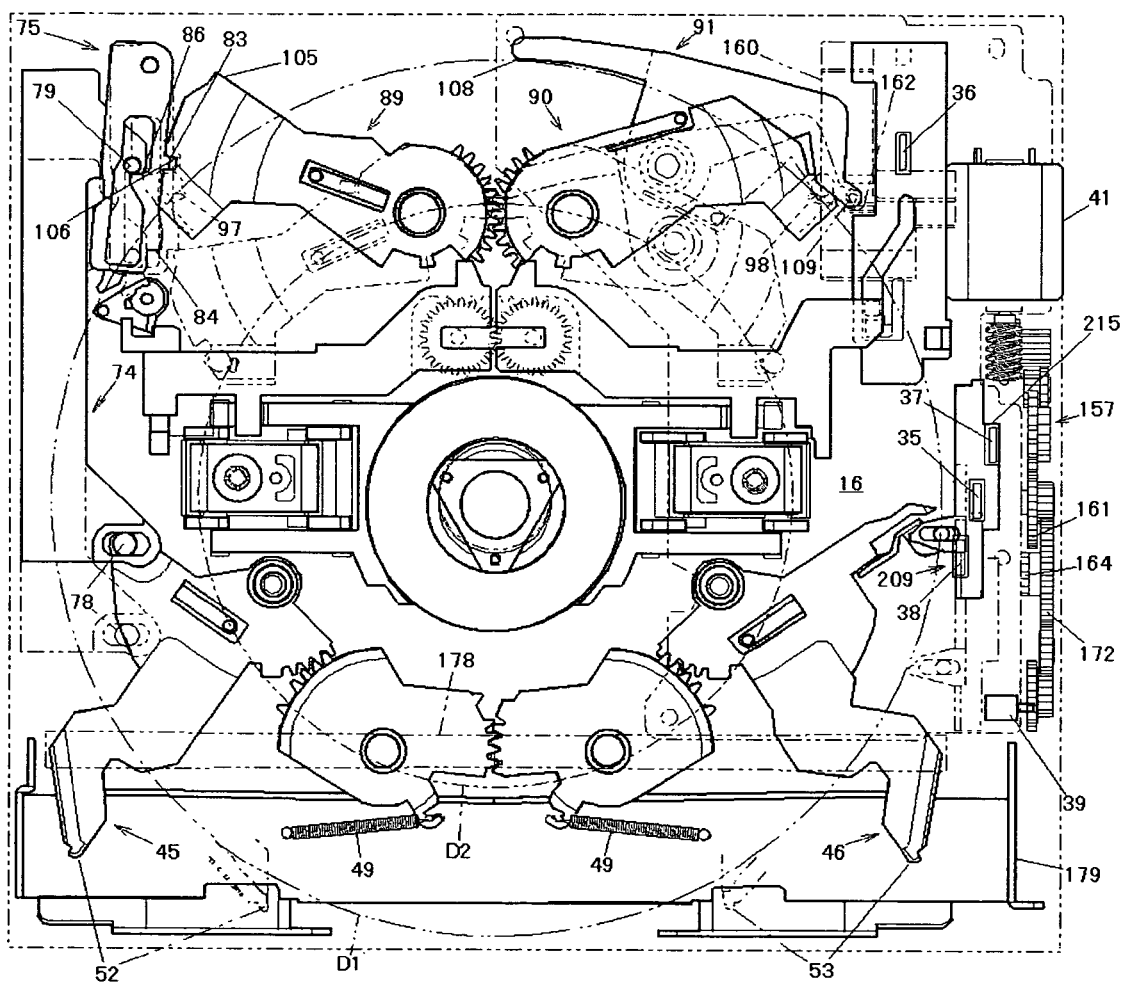
FIG. 23 is a top plan view showing the disc player in a state of use.

When feeding of a disc further proceeds from the state of FIG. 22, when a small disc D2 is inserted, both disc detection members 45, 46 recover to the initial position prior to insertion of the disc while the detection members 45, 46 slide and make contact with the circumference surface of the small disc D2 due to the energizing force of the coil spring 49. The circumference surface of the small disc D2 makes contact with the disc contact unit 108 of the trigger member 91 causing the trigger member 91 to rotate in the clockwise direction. By this rotation, the pressing unit 109 of the trigger member 91 presses the pressed unit 162 of the slide member 160 causing the slide member 160 to move in the disc eject direction. Further, as shown in FIG. 23, the small disc D2 slightly pushes the disc contact unit 108 causing the circumference surface to make contact with each of the stopper units 97, 98 of both stopper members 89, 90. At this time, the left side stopper member 89 latches the first latch receiving unit 105 to the second latching unit 84 of the rotating member 75, so the left side stopper member 89 is prohibited from turning in the clockwise direction and the right side stopper member 90 is prohibited from turning in the counterclockwise direction, and the small disc D2 is fed slightly farther in than the preset loading position until contacting with both stopper units 97, 98 and stops.

On the other hand, when a large disc D1 is inserted, the feeding process continues from the state in FIG. 22 until the circumference surface makes contact with each of the stopper members 97, 98, and because the rotating member 75 rotates in the clockwise direction in the drawing as the cam surface 85 thereof is pressed by the pin 79 of the reciprocating member 74, the first latch receiving unit 105 of the stopper member 89 is not latched to the second latching unit 84, and the stopper units 97, 98 of both stopper members 89, 90 rotate in a direction to mutually separate by being pressed by the circumference surface of the large disc D1. Further, the large disc D1 pushes both stopper units 97, 98 by the circumference surface, and at the same time also pushes the disc contact unit 108 of the trigger member 91 causing the trigger member 91 to rotate in the clockwise direction in relation to the stopper member 90. By so doing, the pressing unit 109 of the trigger member 91 presses the pressed unit 162 of the sliding member 160 causing the sliding member 160 to move in the disc eject direction.

As feeding of the large disc D1 further progresses, as shown in FIG. 23, the left side stopper member 89 is latched to the first latching unit 83 of the rotating member 75 of the second latch receiving unit 106 of the left side stopper member 89. Accordingly, both stopper members 89, 90 are prohibited from further rotation, and the large disc D1 contacts both stopper units 97, 98 and stops when the disc D1 is fed to the preset loading position. In this process, both disc detection members 45, 46 only slightly return with the reciprocating member 74 while sliding and contacting the detection members 45, 46 to the circumference surface of the large disc D1 by the energizing force of the coil spring 49; however, both disc detection members 45, 46 are prohibited from returning thereafter together with the reciprocating member 74 because the pin 79 of the reciprocating member 74 is latched to the third latching unit 86 of the rotating member 75.

Moreover, even in the case where either a large disc D1 or a small disc D2 is inserted, when the sliding member 160 is moved in the disc eject direction pressed by the trigger member 91, the guidance rack plate 161 together with the sliding member 160 moves to the disc eject direction, as shown in FIG. 11 and FIG. 12, and the rack 164 of the guidance rack plate 161 is engaged with the small gear of the fifth gear 172. At this time, the fifth gear 172 is already rotating receiving the driving force of the motor 41, so the guidance rack plate 161 moves to the disc eject direction by the driving force of the motor 41. Then, the cam plate 181 follows by the energizing force of the spring not illustrated hung across the guidance rack plate 161 and the cam plate 181, and the slider 180 which moves integrally with the cam plate 181 moves to engage the rack unit 197 with the small gear of the fifth gear 172. In this manner, the slider 180 moves in the disc eject direction by the power of the motor 41.

The engaging pin 177 of the gear plate 167 is inserted to the cam groove 196 of the slider 180; therefore, the engaging pin 177 moves with the cam groove 196 by the movement of the slider 180. Then, the gear plate 167 rotates in the counterclockwise direction centering the spindle 175 as shown with the virtual line in FIG. 11, and the sixth gear 173 supported axially by the gear plate 167 separates from the fifth gear 172. In this way, the power transfer path from the motor 41 throughout the roller 178 is interrupted and the rotation of the roller 178 stops. In other words, when a disc contacts both stopper units 97, 98, the rotation of the roller 178 stops immediately; therefore, there is no useless rotation while the roller 178 is in contact with the disc, and there is no fear of damaging the data recording surface of the disc by the rotation of the roller 178.

Meanwhile, because the driving force of the motor 41 continues to be transferred to the fifth gear 172; the slider 180 engaged with the fifth gear 172 moves further to the disc eject direction causing the clutch means to switch to the interruption side. In other words, the roller 178 is separated from the disc (refer to FIG. 12) contacting the inclined surface 195 of the slider 180 to the large collar 186 of the roller 178. At this time, the roller supporter 179 rotates in the clockwise direction in the drawing centering the shaft hole 191 while opposing the energizing force of the spring not illustrated which is hung across between the actuator 210.

Figure 24:
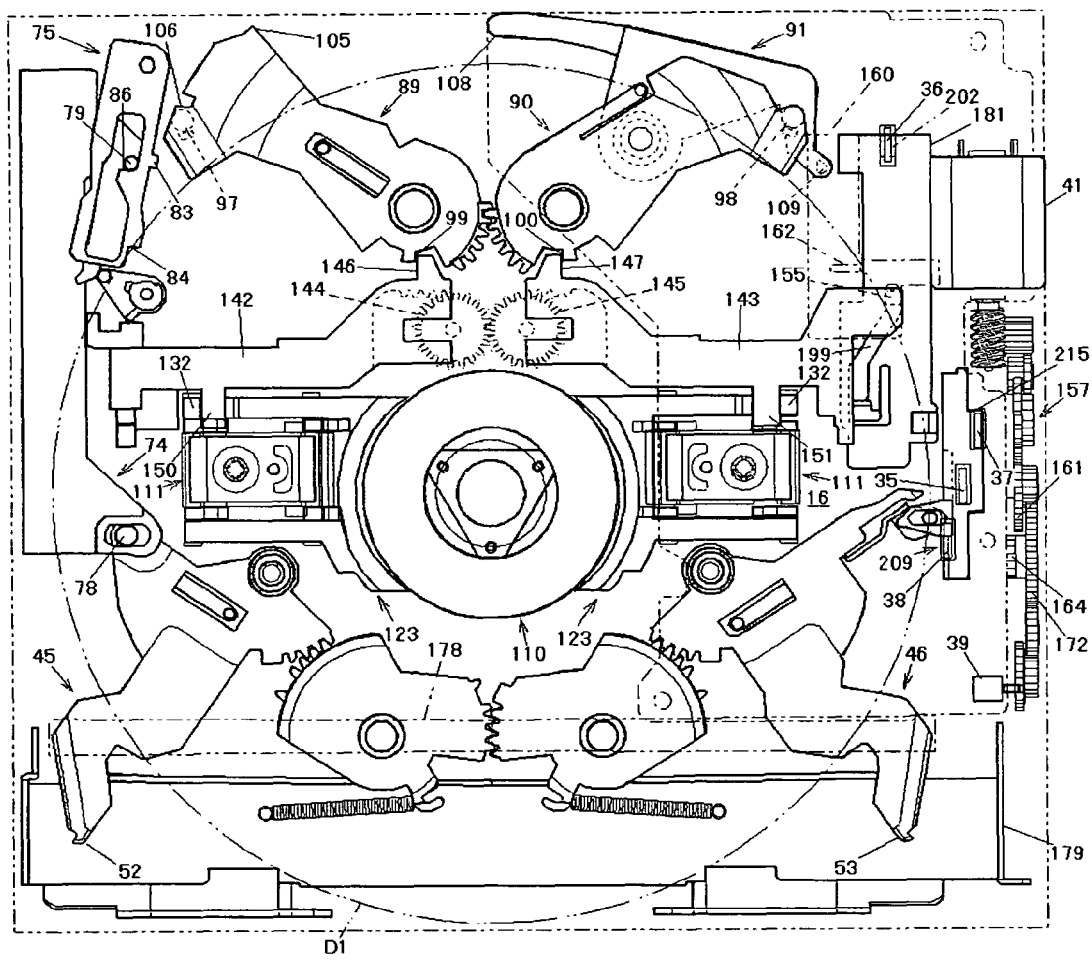
FIG. 24 is a top plan view showing the disc player in a state of use.

When the slider 180 moves to the disc eject direction, the cam plate 181 also moves integrally; however, as shown in FIG. 6, before the cam plate 181 moves, the engaging protrusion 155 of the right side transferring member 143 is located at the foremost position in the drawing within the cam groove 199 of the cam plate 181. From this state, when the cam plate 181 moves to the disc eject direction, the engaging protrusion 155 moves to the furthermost area along the cam groove 199 as shown in FIG. 24, and thereby, the right side transferring member 143 moves to the right side in the drawing, and the left side transferring member 142 moves synchronously to the left side. As described above, when the right and left transferring members 142, 143 are separated from each other, the releasing member 123 is lowered by pressing the legs 132 of the right and left linking mechanisms 111 by each of the first pressing units 150, 151 respectively.

Figure 25:
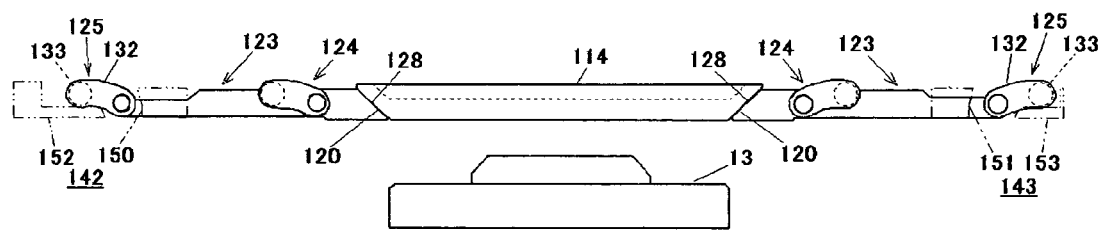
FIG. 25 is a front view showing a state in which the dampers are released from the turntable by a releasing member.
Figure 26:
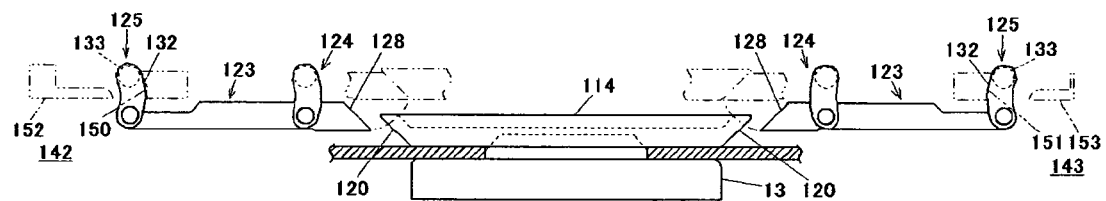
FIG. 26 is a front view showing the state in which a disc is clamped.

FIG. 25 shows the state when releasing the damper member 114 from the turntable 13 while clamping the circumference area of the damper member 114 by the taper surface 128 of the right and left releasing members 123 (the prior state of the cam plate 181 movement). From this state, when the right and left transferring members 142, 143 move in a direction to separate from each other, as shown in FIG. 26, the first pressing units 150, 151 of the transferring members 142, 143 press the leg 132 of the rear linking member 125, and the rear linking member 125 rotates along with the front linking member 124 centering the cylinder 133, and the right and left taper surfaces 128 move downward to the right and left while forming a circular trajectory. Accordingly, these taper surfaces 128 draw apart to the right and left while lowering the damper member 114. When the damper member 114 moves close enough to the turntable 13 standing-by at the lower side of the damper member 114, the taper surfaces 128 separate from the damper member 114 and move to a position to clamp the disc in cooperation with the turntable 13; and the disc is clamped by the magnetic force between the damper 110 and the turntable 13. At this time, if a small disc D2 is loaded, the disc is returned to the designated loading position by the taper surface of the damper member 114, and separated from the stopper units 97, 98.

Meanwhile, at the final stage of right and left movement, after the wall surfaces of the pressed units 99, 100 used for a large disc of the stopper members 89, 90 are pressed by the pressing pieces 146, 147 and the disc is clamped with the damper 110 and the turntable 13, both transferring members 142, 143, as shown in FIG. 24, separate the stopper units 97, 98 from the disc by slightly rotating the stopper units 97, 98 of both stopper members 89, 90 in the direction to separate from each other. FIG. 24 shows the state when a large disc D1 is inserted; however, when a small disc D2 is inserted, the wall surfaces of the pressed units 101, 102 used for a small disc of the stopper members 89, 90 are pressed, and then the stopper units 97, 98 are separated from the circumference surface of the disc.

Further, at the final stage where the cam plate 181 moves to the disc eject direction, when the second switch pressing unit 202 of the cam plate 181 detects the completion of disc insertion by turning on the second switch 36, the loading motor 41 stops. In this manner, the disc is arranged in the playback position and the loading of the disc is complete.

The relationships between the insertion of a large disc D1, small disc D2 and the turning on and off of the first switch 35 through fifth switch 39 are shown in the following table, and by turning each switch on and off, a determination is made whether the inserted disc is a large disc D1 or a small disc D2.

|  | Large Disc D1 | Small Disc D2 |
| --- | --- | --- |
| First switch 16a | ON | OFF |
| Second switch 16b | ON | ON |
| Third switch 16c | ON | OFF |
| Fourth switch 16d | ON | OFF |
| Fifth switch 16e | ON | ON |

Incidentally, when a disc is not inserted, the first switch 35 through the fifth switch 39 are all turned off.

Next, a description will be given hereafter of the operation to discharge to a position where a disc located in the playback position can be retrievable from the disc insertion port 2.

FIG. 24 shows the state where a large disc D1 is arranged at the playback position, and when the eject button not illustrated is pressed while in such condition, the loading motor 41 activates. By this activation, the slider 180 (refer to FIG. 12) through the power transfer mechanism 157 starts moving to the disc insert direction. By so doing, the cam plate 181 moves with the slider 180, thereby separating the second switch pressing unit 202 from the second switch 36 and turning off the second switch 36.

When the slider 180 moves further in the disc insert direction, the engaging protrusion 155 of the transferring member 143 arrives at the front inclined surface from the furthermost area of the cam groove 199 of the cam plate 181. In this manner, the right side transferring member 143 returns to the left side, and the left side transferring member 142 returns to the right side, and the state changes from that in FIG. 24 to FIG. 23.

At this time, the first pressing unit 150, 151 of each of the transferring members 142, 143 separate from the leg 132 of the linking mechanism 111; however, the second pressing unit 152 presses the leg 132 inward from the outside instead, and the rear linking member 125 rotates with the front linking member 124 centering the cylinder 133, and the right and left taper surfaces 128 move upward to the right and left while forming a circular trajectory. At this time, the right and left taper surfaces 128 scoops up the circumference edge of the damper member 114, and the damper 110 releases the turntable 13.

Meanwhile, the stopper members 89, 90 pressed by the pressing pieces 146, 147 of each of the transferring members 142, 143 are released allowing the return of both stopper units 97, 98 rotating in the direction to be closer to each other by the energized spring not illustrated. Further, the stopper units 97, 98 push the exterior of the large disc D1, and the large disc D1 is pushed out to the disc eject direction. At that time, the trigger member 91 also rotates in the counterclockwise direction together with the stopper member 90 and pushes out to a position where the large disc D1 is retrievable from the disc insertion port 2.

When the slider 180 further moves to the disc insert direction, the large collar 186 heretofore pressed by the inclined surface 195 of the slider 180 rises when the pressure exerted by the inclined surface 195 is released causing the roller 178 to make contact with the disc (refer to FIG. 12). At that time, the roller supporter 179 rotates in the counterclockwise direction in the drawing.

At the final stage in which the slider 180 moves in the disc insert direction, the engaging pin 177 of the gear plate 167 which engages with the cam groove 196 arrives at the cam surface as shown in FIG. 11, and the gear plate 167 rotates in the clockwise direction centering the spindle 175. By so doing, the sixth gear 173 axially supported in the gear plate 167 engages with the fifth gear 172, and the driving force of the loading motor 41 is transferred even to the roller 178 initiating rotation in the disc eject direction of the roller 178. And then, the large disc D1 is discharged by the rotation of the roller 178.

When the large disc D1 is discharged by the roller 178, both stopper members 89, 90 return to their initial positions prior to disc insertion shown in FIG. 22; and both detection units 52, 53 follow the circumference surface of the large disc D1 as both disc detection members 45, 46 rotate to discharge further. At that time, when the center of the large disc D1 moves beyond both detection units 52, 53, both disc detection members 45, 46 rotate in the direction to become closer to each other.

By the rotation of both of these disc detection members 45, 46, the reciprocating member 74 moves to the disc eject direction, and the rotating member 75 rotates in the counter-clockwise direction by the energizing force of the spring 77 along the pin 79 of the reciprocating member 74. At that time, the stopper member 89 is returned to its initial position, so the rotating member 75 can rotate without being restricted by the stopper member 89.

When the third switch pressing unit 215 of the position detection member 209 which is linked with the disc detection member 46 is removed from the third switch 37 as shown in FIG. 21, the third switch 37 is turned off thereby detecting the completion of the discharge of the large disc D1 and stopping the motor 41. In the case of discharging a small disc D2, when the fourth switch pressing unit 216 of the member 209 separates from the fourth switch 38 thereby detecting the completion of the disc discharge and stopping the motor 41.

In addition, the taper surface 120 is used for the damper member 114, and the taper surface 128 is used for the releasing member 123 respectively with the present Embodiment; however, it is not be limited to these, and the component force to release the damper member 114 from the turntable 13 can be obtained by the releasing member 123 even if a taper surface (inclined surface) is provided only to at least one of either the damper member 114 or releasing member 123.

Further, the linkage span is the same with the front linking member 124 and the rear linking member 125 with the present Embodiment; however, it is not limited to this, and an incline occurs with the releasing member in relation to the damper even if the linkage span of the rear linking member 125 is slightly longer than the linkage span of the front linking member 124; therefore, the detachment force of the damper in accompany with the rotation of the front linking member 124 and the rear linking member 125 can be greatly enhanced.

What is claimed is:

1. A disc loading apparatus, comprising:
   a frame (5);
   a disc guide (32);
   a pair of disc detection members (45, 46) mounted in said frame providing detection units (52, 53) respectively;
   an interlocking mechanism (47, 48) mounted in the frame so as to rotate these detection members in synchronization; and
   a roller (178) mounted in the frame so as to clamp a disc in cooperation with the disc guide, and feed said disc by a rotational operation;
   wherein
   said pair of detection members rotate in the widening direction of the mutual gap of the detection members while each of the detection members is pushed to the circumference of the inserted disc; and
   the disc position and disc diameter are detected by the rotation amount of the pair of disc detection members, and disc clamping by the roller and the disc guide according to the disc position and the diameter, and the roller rotation are controlled,
   wherein said disc loading apparatus further comprises:
   a top panel (17) provided in the frame;
   a second mounting unit (28) formed on a portion of said top panel;
   a first mounting unit (29) formed on another portion of the top panel;
   a stepped unit (30) formed between the first and second mounting units by sagging the upper surface of the second mounting unit downward more than the lower surface of the first mounting unit; and
   a notch (31) formed in said stepped unit;
   wherein
   a portion of the disc guide is constituted in the second mounting unit, and the interlocking mechanisms are mounted on the upper surface of the second mounting unit;
   the pair of disc detection members is mounted on the lower surface of the first mounting unit, and these detection members are arranged throughout the lower surface of the first mounting unit and the upper surface of the second mounting unit.

2. The disc loading apparatus according to claim 1, wherein the notch has an end to regulate the rotation range of at least one of the disc detection members.

* * * * *